(12) United States Patent
Bates

(10) Patent No.: US 11,184,645 B2
(45) Date of Patent: *Nov. 23, 2021

(54) TEMPORARY CONFIGURATION OF A MEDIA PLAYBACK SYSTEM WITHIN A PLACE OF ACCOMMODATION

(71) Applicant: Sonos, Inc., Santa Barbara, CA (US)

(72) Inventor: Paul Andrew Bates, Santa Barbara, CA (US)

(73) Assignee: Sonos, Inc., Santa Barbara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/915,292

(22) Filed: Jun. 29, 2020

(65) Prior Publication Data

US 2020/0396490 A1 Dec. 17, 2020

Related U.S. Application Data

(63) Continuation of application No. 15/947,559, filed on Apr. 6, 2018, now Pat. No. 10,698,650.

(51) Int. Cl.
*H04N 21/214* (2011.01)
*G06F 3/16* (2006.01)
(Continued)

(52) U.S. Cl.
CPC ......... *H04N 21/2143* (2013.01); *G06F 3/162* (2013.01); *G06F 3/165* (2013.01);
(Continued)

(58) Field of Classification Search
CPC ...... G06F 3/162; G06F 3/165; G06F 9/44505; G06F 16/635; G06F 17/30761; G06Q 10/02; H04N 21/2143; H04N 21/4532
(Continued)

(56) References Cited

U.S. PATENT DOCUMENTS

| 5,440,644 A | 8/1995 | Farinelli et al. |
| 5,761,320 A | 6/1998 | Farinelli et al. |

(Continued)

FOREIGN PATENT DOCUMENTS

| EP | 1389853 A1 | 2/2004 |
| WO | 200153994 | 7/2001 |
| WO | 2003093950 A2 | 11/2003 |

OTHER PUBLICATIONS

AudioTron Quick Start Guide, Version 1.0, Mar. 2001, 24 pages.
(Continued)

*Primary Examiner* — Hemant S Patel
(74) *Attorney, Agent, or Firm* — Akerman LLP

(57) ABSTRACT

Example techniques may involve temporary configuration of a media playback system in a place of accommodation, such as a hotel. In particular, the media playback system in a guest's room is configured with one or more settings of the guest's home media playback system. Example settings include user accounts of a various services, such as streaming audio services and/or voice assistant services. Other example settings include artists, albums, audio tracks, audio books, stations, and other audio content that the guest previously designated as a favorite using their home media playback system. When the guest leaves (e.g., checks-out of) of the place of accommodation, these settings are removed from the media playback system in the guest's room.

20 Claims, 12 Drawing Sheets

(51) Int. Cl.
  *G06F 9/445*     (2018.01)
  *G06F 16/635*    (2019.01)
  *H04N 21/45*     (2011.01)
  *G06Q 10/02*     (2012.01)

(52) U.S. Cl.
  CPC ........ *G06F 9/44505* (2013.01); *G06F 16/635* (2019.01); *H04N 21/4532* (2013.01); *G06Q 10/02* (2013.01)

(58) Field of Classification Search
  USPC .......................................................... 700/94
  See application file for complete search history.

(56) References Cited

U.S. PATENT DOCUMENTS

| | | | |
|---|---|---|---|
| 5,923,902 | A | 7/1999 | Inagaki |
| 6,032,202 | A | 2/2000 | Lea et al. |
| 6,256,554 | B1 | 7/2001 | DiLorenzo |
| 6,404,811 | B1 | 6/2002 | Cvetko et al. |
| 6,469,633 | B1 | 10/2002 | Wachter |
| 6,522,886 | B1 | 2/2003 | Youngs et al. |
| 6,611,537 | B1 | 8/2003 | Edens et al. |
| 6,631,410 | B1 | 10/2003 | Kowalski |
| 6,757,517 | B2 | 6/2004 | Chang |
| 6,778,869 | B2 | 8/2004 | Champion |
| 7,130,608 | B2 | 10/2006 | Hollstrom et al. |
| 7,130,616 | B2 | 10/2006 | Janik |
| 7,143,939 | B2 | 12/2006 | Henzerling |
| 7,236,773 | B2 | 6/2007 | Thomas |
| 7,295,548 | B2 | 11/2007 | Blank et al. |
| 7,391,791 | B2 | 6/2008 | Balassanian et al. |
| 7,483,538 | B2 | 1/2009 | McCarty et al. |
| 7,571,014 | B1 | 8/2009 | Lambourne et al. |
| 7,630,501 | B2 | 12/2009 | Blank et al. |
| 7,643,894 | B2 | 1/2010 | Braithwaite et al. |
| 7,657,910 | B1 | 2/2010 | McAulay et al. |
| 7,853,341 | B2 | 12/2010 | McCarty et al. |
| 7,987,294 | B2 | 7/2011 | Bryce et al. |
| 8,014,423 | B2 | 9/2011 | Thaler et al. |
| 8,045,952 | B2 | 10/2011 | Oureshey et al. |
| 8,103,009 | B2 | 1/2012 | McCarty et al. |
| 8,234,395 | B2 | 7/2012 | Millington |
| 8,483,853 | B1 | 7/2013 | Lambourne |
| 8,903,425 | B2 | 12/2014 | Guenec et al. |
| 8,942,252 | B2 | 1/2015 | Balassanian et al. |
| 10,698,650 | B2 * | 6/2020 | Bates ...................... G06F 3/165 |
| 2001/0042107 | A1 | 11/2001 | Palm |
| 2002/0022453 | A1 | 2/2002 | Balog et al. |
| 2002/0026442 | A1 | 2/2002 | Lipscomb et al. |
| 2002/0124097 | A1 | 9/2002 | Isely et al. |
| 2003/0061077 | A1 | 3/2003 | Sagar |
| 2003/0157951 | A1 | 8/2003 | Hasty |
| 2004/0024478 | A1 | 2/2004 | Hans et al. |
| 2007/0142944 | A1 | 6/2007 | Goldberg et al. |
| 2009/0271609 | A1 | 10/2009 | Baskey et al. |
| 2011/0314497 | A1 | 12/2011 | Warrick et al. |
| 2011/0314502 | A1 | 12/2011 | Levy et al. |
| 2015/0312299 | A1 | 10/2015 | Chen |
| 2016/0330488 | A1 | 11/2016 | Ogle et al. |

OTHER PUBLICATIONS

AudioTron Reference Manual, Version 3.0, May 2002, 70 pages.
AudioTron Setup Guide, Version 3.0, May 2002, 38 pages.
Bluetooth "Specification of the Bluetooth System: The ad hoc SCATTERNET for affordable and highly functional wireless connectivity," Core, Version 1.0 A, Jul. 26, 1999, 1068 pages.
Bluetooth "Specification of the Bluetooth System: Wireless connections made easy," Core, Version 1.0B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
International Bureau, International Preliminary Report on Patentability and Written Opinion, dated Oct. 15, 2020, issued in connection with International Application No. PCT/US2019/026113, filed on Apr. 5, 2019, 10 pages.
International Bureau, International Search Report and Written Opinion dated Jun. 27, 2019, issued in connection with International Application No. PCT/US2019/026113, filed on Apr. 5, 2019, 12 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Non-Final Office Action dated Jun. 25, 2019, issued in connection with U.S. Appl. No. 15/947,559, filed Apr. 6, 2018, 11 pages.
Notice of Allowance dated Oct. 15, 2019, issued in connection with U.S. Appl. No. 15/947,559, filed an Apr. 6, 2018, 5 pages.
Notice of Allowance dated Feb. 25, 2020, issued in connection with U.S. Appl. No. 15/947,559, filed Apr. 6, 2018, 5 pages.
Palm, Inc., "Handbook for the Palm VII Handheld," May 2000, 311 pages.
Presentations at WinHEC 2000, May 2000,138 pages.
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004,16 pages.
Yamaha DME Designer 3.5 User Manual; Copyright 2004, 507 pages.

\* cited by examiner

TEMPORARY CONFIGURATION OF A MEDIA PLAYBACK SYSTEM WITHIN A PLACE OF ACCOMMODATION

CROSS-REFERENCE TO RELATED APPLICATIONS

This application claims priority under 35 U.S.C. § 120 to, and is a continuation of, U.S. non-provisional patent application Ser. No. 15/947,559, filed on Apr. 6, 2018, entitled "Temporary Configuration of A Media Playback System Within A Place of Accommodation," which is incorporated herein by reference in its entirety.

FIELD OF THE DISCLOSURE

The disclosure is related to consumer goods and, more particularly, to methods, systems, products, features, services, and other elements directed to media playback or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The Sonos Wireless HiFi System enables people to experience music from many sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

Figure 1:
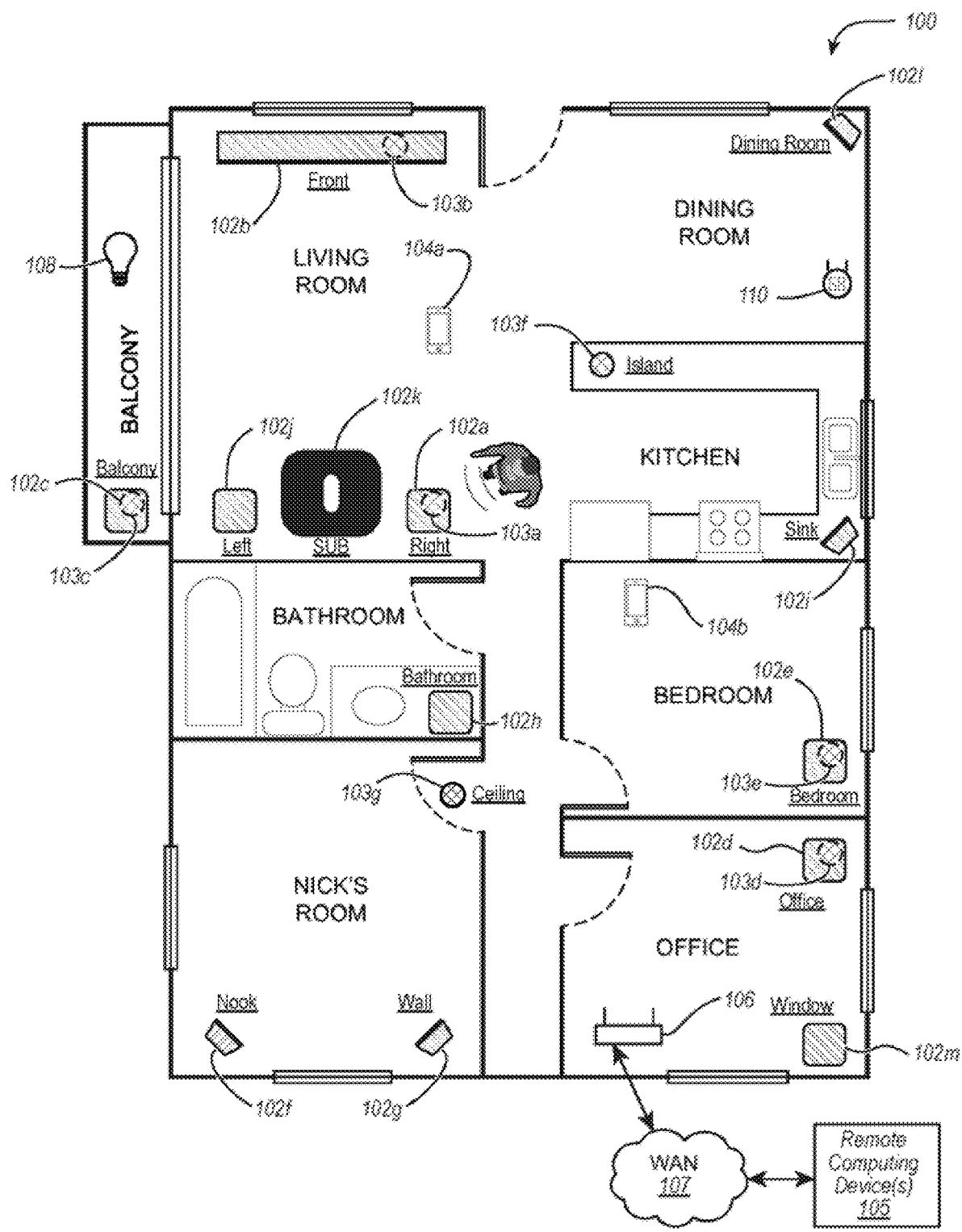
FIG. 1 shows an example home media playback system configuration in which certain embodiments may be practiced.

The drawings are for the purpose of illustrating example embodiments, but it is understood that the inventions are not limited to the arrangements and instrumentality shown in the drawings.

DETAILED DESCRIPTION

I. Overview

Examples implementations described herein involve temporarily configuring a media playback system within a place of accommodation with settings, playlists, favorites, services and other customization options (collectively referred to as "home settings") that are configured with a guest's media playback system in their home. Such configuration may be performed in advance of, or at the time of, a guest's check-in to a room such that the media playback system in that room is configured when the guest arrives in the room. Alternatively, detection of the guest's personal device (e.g., smartphone or tablet) by the media playback system may trigger the media playback system to configure with the guest's home settings.

Many places of accommodation, such as hotels, motels, bed & breakfasts, and other places of temporary lodging (collectively referred to as "hotels") have online booking systems to facilitate room reservations and check-in. Such booking systems are hosted on cloud servers and accessed via a website or smartphone app by either hotel employees (e.g., at the front desk or at a call center) or by the guests themselves. Example booking systems support user accounts to facilitate room reservations, check-in, and rewards programs of individual guests. Accordingly, a hotel user account may indicate a particular guest's room reservations, as well as their check-in status with respect to a particular room within the hotel.

In some implementations, a guest's hotel user account is linked to the Household ID (HHID) of the guest's home media playback system. Example media playback systems may each have a globally-unique HHID that distinguishes the media playback systems from one another. The HHID of a given media playback system may also define a user profile for that media playback system. A user profile of a particular media playback system (having a unique HHID) may define various settings of the media playback system. Within examples, such user profiles are maintained on one or more playback devices of the media playback system and/or on cloud servers.

Creating a link between the Household ID of a guest's hotel user account and their Household ID of the guest's home media playback system allows the guest's home media playback system to share its home settings with the particular media playback system in the room that the guest will be staying. A guest may create such an association in advance of their stay (e.g., at the time of booking) perhaps by providing the HHID of their media playback system or credentials of their media playback system user profile (e.g., a user name and password). When the guest checks-in using the booking system (or when the reservation begins), the media playback system in the room booked by the guest retrieves the home settings of the guest's media playback system from the guest's home media playback system or a cloud server that is maintaining the guest's user profile.

When the guest arrives in the room of the hotel, the media playback system in the room may output an audible welcome notice indicating that the media playback system is configured with the home settings of the guest's media playback system. For example, if a guest (e.g., Nick) is checking into room 2, a playback device of the media playback system may output "Hello Nick, welcome to room 2, your Sonos system is ready." Such a message may be output via a voice assistant service configured with the guest's home media playback system.

In some examples, a room's media playback system is configured with the home settings of a guest's media playback system upon the guest arriving in the room. A guest's personal device may be configured to detect a beacon or other message identifying the media playback system within the room (e.g., via a HHID or other universally unique identifier). Such a personal device may operate as a control device of the guest's home media playback system, perhaps via a control application installed on the personal device. The personal device may respond to the beacon message with the HHID of the guest's media playback system or credentials of their media playback system user profile.

As noted above, during a guest's stay in a room, the media playback system in that room may temporarily adopt the settings, playlists, favorites, services and other customization options (collectively referred to as "home settings") that are configured with a guest's media playback system in their home. For instance, the media playback system in that room may set-up user accounts of one or more streaming audio services (e.g., Spotify® or Pandora®, among others) that are configured with the guest's media playback system in their home. As another example, the media playback system in that room may include multiple zones (e.g., bedroom and bathroom) and may configure those zones with respective settings of zones in the user's media playback system that correspond to those zone (e.g., master bedroom and bathroom). As a further example, if a guest's home media playback system has multiple profiles corresponding to different members of the household, the media playback system in that room may adopt settings of the user profile(s) that correspond to the guest(s) that are staying in the room.

Example media playback systems described herein may include networked microphone devices (NMDs) to facilitate interaction with voice assistant services. In some examples, the media playback system within a hotel room may be temporarily configured with an account of a voice assistant service. Voice assistant services often act as hubs for smart home settings. As such, configuring a media playback system with a hotel room with a guest's voice assistant service account may facilitate merging one or more of the guest's smart home settings at home with smart home features, such as smart lights, at hotel.

In example implementations, the media playback system within a place of accommodation may maintain its temporary configuration with the guest's home settings for the duration of the guest's stay. However, such personalization to the user raises some privacy issues, as hotel staff may enter the room (e.g., for housekeeping service) during the guest's stay. To prevent unauthorized access to the media playback system in the guest's room, the media playback system may enable a restricted mode that disables features such as voice-based purchases, message sending, calendar features, and other potentially sensitive features while the guest is not in the room. The hotel may detect whether a guest is in the room using a variety of techniques, such as geo-fencing a guest's personal device, using room entry credentials (e.g., a keycard) or by user recognition (e.g., via voice, face, or other biometric).

When the guest's check-out of the room, the media playback system disassociates the media playback system in the room with the guest's Household ID of the guest's home media playback system, which cause the temporary configuration of the media playback system in the room to end. In some examples, the media playback system in the room automatically disassociates the guest's Household ID of the guest's home media playback system when the guest checks-out. Alternatively, the guest may initiate disassociation using input to the media playback system (e.g., via a control on a smartphone app or voice command).

The guest's user profile may maintain some personalization that occurred during the guest's stay. For instance, if the guest created or modified playlist or access a curated playlist with the media playback system in the hotel, data indicating that information may be associated with the guest's user profile. Listening history and other usage data from the stay may be retained in the user profile.

As noted above, example techniques may involve temporary configuration of a media playback system within a place of accommodation, such as a hotel, motel, bed & breakfast, inn or other place of temporary lodging. Example implementations described herein may be embodied as a method, a device configured to carry out the implementation, a system of devices configured to carry out the implementation, or a non-transitory computer-readable medium containing instructions that are executable by one or more processors to carry out the implementation, among other examples. It will be understood by one of ordinary skill in the art that this disclosure includes numerous other embodiments, including combinations of the example features described herein. Further, any example operation described as being performed by a given device to illustrate a technique may be performed by any suitable devices, including the devices described herein. Yet further, any device may cause another device to perform any of the operations described herein.

A first implementation may include receiving, via a network interface of a computing system, data indicating a guest reservation to a place of accommodation having multiple first media playback systems corresponding to respective individually bookable rooms, the guest reservation indicating (i) a user profile of a second media playback system and (ii) a booked room of the place of accommodation; querying, via the network interface of the computing system, one or more cloud servers for a system configuration of the second media playback system, the system configuration indicating configuration of one or more second playback devices of the second media playback system into respective zones of the second media playback system; and during a stay associated with the guest reservation, configuring, via the network interface of the computing system, a particular first media playback system within the booked room with one or more settings represented in the system configuration of the second media playback system, wherein configuring the particular first media playback system within the booked room with one or more settings represented in the system configuration of the second media playback system comprises configuring a first zone of the particular first media playback system with one or more settings of at least one zone of the second media playback system.

A second implementation may include detecting, via the wireless personal area network interface, a beacon transmitted from a playback device of a particular first media playback system, the beacon including data identifying a particular room of a place of accommodation having multiple first media playback systems corresponding to respective individually bookable rooms; in response to detecting the beacon transmitted from the playback device of the particular first media playback system, causing a graphical display of the mobile device to display a prompt to configure the particular first media playback system with a system configuration of a second media playback system, wherein a control interface on the mobile device is configured with a user profile of the second media playback system to control the audio playback by the second media playback system; detecting, via the graphical display, touch input data indicating a selection of a particular selectable control within the displayed prompt that, when selected, causes the mobile device to configure the particular first media playback system with the system configuration of the second media playback system; and in response to detecting the touch input data indicating the selection of the particular selectable control within the displayed prompt, causing, via a wireless network interface, one or more servers of a computing system to configure the particular first media playback system with one or more settings represented in a system configuration of the second media playback system.

A third implementation may include a system comprising multiple first media playback systems corresponding to respective individually bookable rooms of a place of accommodation; and a sensor to detect presence of one or more guests in a particular bookable room. During a guest stay in the particular bookable room, the third implementation may include configuring, via a network interface of the computing system, a particular first media playback system within the particular bookable room with one or more settings represented in a system configuration of a second media playback system that is registered to a user profile associated with a guest reservation for the guest stay in the particular bookable room; while the particular first media playback system is configured with the one or more settings represented in the system configuration of the second media playback system during the guest stay in the particular bookable room, detecting, via the sensor, that the one or more guests are not present in the particular bookable room; and in response to detecting that the one or more guests are not present in the particular bookable room, causing, via the network interface, the particular first media playback system to disable one or more first features of the particular first media playback system, wherein one or more second features of the particular first media playback system are enabled while the sensor detects that the one or more guests are not present in the particular bookable room.

While some examples described herein may refer to functions performed by given actors such as "users" and/or other entities, it should be understood that this description is for purposes of explanation only. The claims should not be interpreted to require action by any such example actor unless explicitly required by the language of the claims themselves.

Moreover, some functions are described herein as being performed "based on" or "in response to" another element or function. For the sake of brevity, functions are generally described as being based on another function when a functional link exists; however, disclosure of "based on" or "in response to" should be understood as disclosing either type of functional relationship. In the claims, "based on" should be understood that one element or function is related to another function or element and "in response to" should be understood as one element or function being a necessary result of another function or element.

II. Example Operating Environment

FIG. 1 illustrates an example configuration of a media playback system 100 in which one or more embodiments disclosed herein may be implemented. The media playback system 100 as shown is associated with an example home environment having several rooms and spaces, such as for example, an office, a dining room, and a living room. Within these rooms and spaces, the media playback system 100 includes playback devices 102 (identified individually as playback devices 102a-102m), network microphone devices 103 (identified individually as "NMD(s)" 103a-103g), and controller devices 104a and 104b (collectively "controller devices 104"). The home environment may include other network devices, such as one or more smart illumination devices 108 and a smart thermostat 110. FIG. 1 is representative of a media playback system that a guest might have in their home.

The various playback, network microphone, and controller devices 102-104 and/or other network devices of the media playback system 100 may be coupled to one another via point-to-point connections and/or over other connections, which may be wired and/or wireless, via a LAN including a network router 106. For example, the playback device 102j (designated as "Left") may have a point-to-point connection with the playback device 102a (designated as "Right"). In one embodiment, the Left playback device 102j may communicate over the point-to-point connection with the Right playback device 102a. In a related embodiment, the Left playback device 102j may communicate with other network devices via the point-to-point connection and/or other connections via the LAN.

The network router 106 may be coupled to one or more remote computing device(s) 105 via a wide area network (WAN) 107. In some embodiments, the remote computing device(s) 105 may be cloud servers. The remote computing device(s) 105 may be configured to interact with the media playback system 100 in various ways. For example, the remote computing device(s) may be configured to facilitate streaming and controlling playback of media content, such as audio, in the home environment, perhaps as part of providing a streaming audio service via WAN 107.

In some examples, the remote computing device(s) 105 may be representative of cloud servers from multiple services, perhaps operated by different entities. Such services may include streaming audio services and voice assistance services (VAS)s. The remote computing device(s) 105 may also be representative of cloud-based booking systems of one or more places of accommodation. The remote computing device(s) 105 may further be representative of cloud-based services provided by the manufacturer of the playback devices 102 to facilitate additional features of the media playback system 100.

Within examples, the media playback system 100 is differentiated from other media playback systems using an identifier referred to herein as a household identifier (HHID). The HHID may be a string of numeric or alphanumeric characters that are computer-generated to facilitate a unique HHID for each media playback system. A globally unique identifier may facilitate various cloud services, as servers of a cloud service may distinguish media playback systems belonging to different users by way of the HHID.

The HHID of a given media playback system (e.g., the media playback system 100) may also identify a system configuration for that media playback system. For instance, HHID may be used as a primary key in a database storing system configurations for a plurality of media playback systems. In this way, the system configuration of a particular media playback system can be accessed by reference to the unique HHID of that media playback system.

The system configuration of a particular media playback system may define a plurality of configuration variables or parameters. For instance, the system configuration of media playback system 100 may include network parameters such as the channel(s) (e.g., respective frequency bands), service set identifier (SSID) (a sequence of alphanumeric characters as a name of a wireless network), and WPA keys or other security key of the network provided by network router 106, which the network devices of media playback system 100 use to connect to the network. The system configuration of media playback system 100 may also include the zone configuration for each playback device 102, which may define parameters such as zone name, zone configuration (e.g., whether the zone is a bonded zone), and other zone-related parameters.

The system configuration of a particular media playback system may also include one or more user profiles corresponding to respective users of the media playback system. Each user profile may include various settings and parameters that are unique to a given user. For instance, a given user profile may define playlists, favorites (e.g., favorite tracks, albums, artists, stations, audio books, etc.), alarms, and other individualized settings and parameters. A given household might include one user, in which case a single user profile might be configured, or the household might include multiple users, in which case a user profile might be configured for each user. In some cases, multiple users may share a single user profile.

Yet further, the system configuration may include various user accounts of one or more cloud services, such as streaming audio services and voice assistant services. In some implementations, each user account may be associated with a given user profile. For instance, a given user of the media playback system 100 may register credentials of multiple streaming audio services with their user profile to enable the playback devices 102 of the media playback system 100 to streaming audio content from those streaming audio services. As another example, the given user of the media playback system 100 may register credentials of a voice assistant service with their user profile to enable the NMDs 103 of the media playback system 100 to query the voice assistant service with voice commands.

In some embodiments, one or more of the playback devices 102 may include an on-board (e.g., integrated) network microphone device. For example, the playback devices 102a-e include corresponding NMDs 103a-e, respectively. Playback devices that include network microphone devices may be referred to herein interchangeably as a playback device or a network microphone device unless indicated otherwise in the description.

In some embodiments, one or more of the NMDs 103 may be a stand-alone device. For example, the NMDs 103f and 103g may be stand-alone network microphone devices. A stand-alone network microphone device may omit components typically included in a playback device, such as a speaker or related electronics. In such cases, a stand-alone network microphone device may not produce audio output or may produce limited audio output (e.g., relatively low-quality audio output).

In use, a network microphone device may receive and process voice inputs from a user in its vicinity. For example, a network microphone device may capture a voice input upon detection of the user speaking the input. In the illustrated example, the NMD 103a of the playback device 102a in the Living Room may capture the voice input of a user in its vicinity. In some instances, other network microphone devices (e.g., the NMDs 103b and 103f) in the vicinity of the voice input source (e.g., the user) may also detect the voice input. In such instances, network microphone devices may arbitrate between one another to determine which device(s) should capture and/or process the detected voice input. Examples for selecting and arbitrating between network microphone devices may be found, for example, in U.S. application Ser. No. 15/438,749 filed Feb. 21, 2017, and titled "Voice Control of a Media Playback System," which is incorporated herein by reference in its entirety.

In certain embodiments, a network microphone device may be assigned to a playback device that might not include a network microphone device. For example, the NMD 103f may be assigned to the playback devices 102i and/or 102l in its vicinity. In a related example, a network microphone device may output audio through a playback device to which it is assigned. Additional details regarding associating network microphone devices and playback devices as designated or default devices may be found, for example, in previously referenced U.S. patent application Ser. No. 15/438,749.

Further aspects relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in other home environment configurations comprising more or fewer of any of the playback, network microphone, and/or control devices 102-104. Additionally, the technologies described herein may be useful in environments where multi-zone audio may be desired, such as, for example, a commercial setting like a restaurant, mall, airport or place of accommodation, a vehicle like a sports utility vehicle (SUV), bus or car, a ship or boat, an airplane, and so on.

a. Example Playback Devices

Figure 2A:
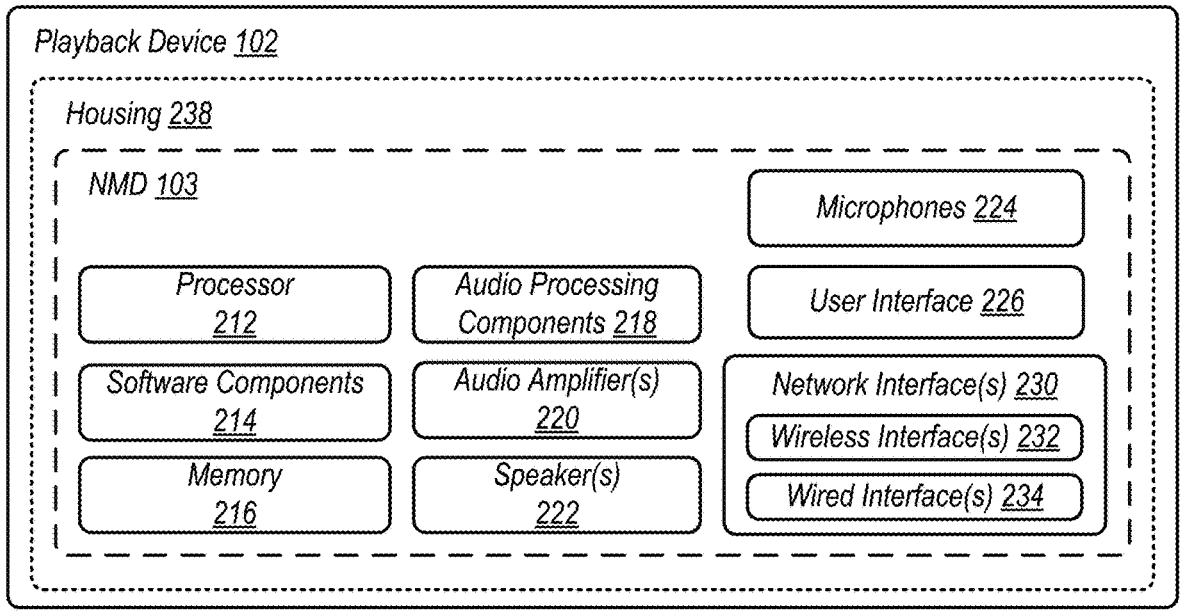
FIG. 2A is a functional block diagram of an example playback device in accordance with aspects of the disclosure.

FIG. 2A is a functional block diagram illustrating certain aspects of a selected one of the playback devices 102 shown in FIG. 1. As shown, such a playback device may include a processor 212, software components 214, memory 216, audio processing components 218, audio amplifier(s) 220, speaker(s) 222, microphone(s) 224, and a network interface 230 including wireless interface(s) 232 and wired interface(s) 234. In some embodiments, a playback device might not include the speaker(s) 222, but rather a speaker interface for connecting the playback device to external speakers. In certain embodiments, the playback device may include neither the speaker(s) 222 nor the audio amplifier(s) 222, but rather an line-out interface for connecting a playback device to an external audio amplifier or audio-visual receiver. The playback device includes a housing 238 carrying its constituent components.

A playback device may further include a user interface 226. The user interface 226 may facilitate user interactions independent of or in conjunction with one or more of the control devices 104. In various embodiments, the user interface 226 includes one or more of physical buttons and/or graphical user interfaces provided on touch sensitive screen(s) and/or surface(s), among other possibilities, for a user to directly provide input. The user interface 226 may further include one or more of lights and the speaker(s) to provide visual and/or audio feedback to a user.

In some embodiments, the processor 212 may be a clock-driven computing component configured to process input data according to instructions stored in the memory 216. The memory 216 may be a tangible computer-readable medium configured to store instructions executable by the processor 212. For example, the memory 216 may be data storage that can be loaded with one or more of the software components 214 executable by the processor 212 to achieve certain functions. In one example, the functions may involve a playback device retrieving audio data from an audio source or another playback device. In another example, the functions may involve a playback device sending audio data to another device on a network. In yet another example, the functions may involve pairing of a playback device with one or more other playback devices to create a multi-channel audio environment.

Certain functions may involve a playback device synchronizing playback of audio content with one or more other playback devices. During synchronous playback, a listener may not perceive time-delay differences between playback of the audio content by the synchronized playback devices. U.S. Pat. No. 8,234,395 filed Apr. 4, 2004, and titled "System and method for synchronizing operations among a plurality of independently clocked digital data processing devices," which is hereby incorporated by reference in its entirety, provides in more detail some examples for audio playback synchronization among playback devices.

The audio processing components 218 may include one or more digital-to-analog converters (DAC), an audio preprocessing component, an audio enhancement component or a digital signal processor (DSP), and so on. In some embodiments, one or more of the audio processing components 218 may be a subcomponent of the processor 212. In one example, audio content may be processed and/or intentionally altered by the audio processing components 218 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback, the audio processing components 208 may be configured to process audio content to be sent to one or more other playback devices for playback.

Audio content to be processed and/or played back by a playback device may be received from an external source, such as via an audio line-in input connection (e.g., an auto-detecting 3.5 mm audio line-in connection) or the network interface 230.

The network interface 230 may be configured to facilitate a data flow between a playback device and one or more other devices on a data network. As such, a playback device may be configured to receive audio content over the data network from one or more other playback devices in communication with a playback device, network devices within a local area network, or audio content sources over a wide area network such as the Internet. In one example, the audio content and other signals transmitted and received by a playback device may be transmitted in the form of digital packet data containing an Internet Protocol (IP)-based source address and IP-based destination addresses. In such a case, the network interface 230 may be configured to parse the digital packet data such that the data destined for a playback device is properly received and processed by the playback device.

As shown, the network interface 230 may include wireless interface(s) 232 and wired interface(s) 234. The wireless interface(s) 232 may provide network interface functions for a playback device to wirelessly communicate with other devices (e.g., other playback device(s), speaker(s), receiver(s), network device(s), control device(s) within a data network the playback device is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 234 may provide network interface functions for a playback device to communicate over a wired connection with other devices in accordance with a communication protocol (e.g., IEEE 802.3). While the network interface 230 shown in FIG. 2 includes both wireless interface(s) 232 and wired interface(s) 234, the network interface 230 might include only wireless interface(s) or only wired interface(s) in various examples.

Figure 2B:
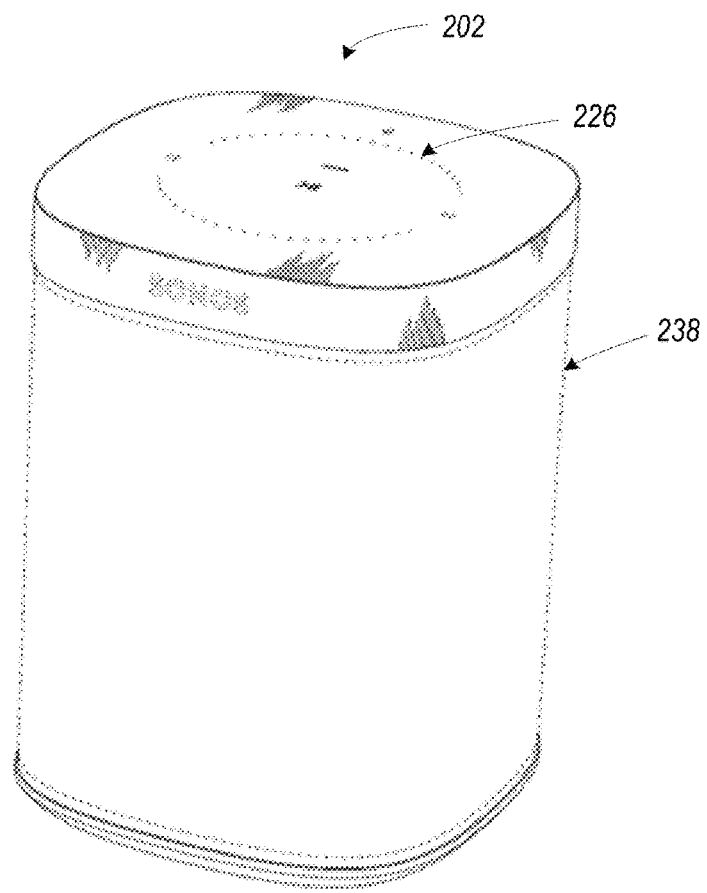
FIG. 2B is a isometric diagram of an example playback device in accordance with aspects of the disclosure.

As discussed above, a playback device may include a network microphone device, such as one of the NMDs 103 shown in FIG. 1. A network microphone device may share some or all the components of a playback device, such as the processor 212, the memory 216, the microphone(s) 224, etc. In other examples, a network microphone device includes components that are dedicated exclusively to operational aspects of the network microphone device. For example, a network microphone device may include far-field microphones and/or voice processing components, which in some instances a playback device may not include. In another example, a network microphone device may include a touch-sensitive button for enabling/disabling a microphone. In yet another example, a network microphone device can be a stand-alone device, as discussed above. FIG. 2B is an isometric diagram showing an example playback device 202 incorporating a network microphone device. The playback device 202 has a user interface 226 on the top surface that includes controls for enabling/disabling microphone(s). The user interface 226 also includes transport controls for controlling playback.

By way of illustration, SONOS, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the examples illustrated in FIGS. 2A and/or 2B or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 100 of FIG. 1, the environment may have one or more playback zones, each with one or more playback devices. The media playback system 100 may be established with one or more playback zones, after which one or more zones may be added, or removed to arrive at the example configuration shown in FIG. 1. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 1, the balcony, dining room, kitchen, bathroom, office, and bedroom zones each have one playback device, while the living room and master bedroom zones each have multiple playback devices. In the living room zone, playback devices 102a, 102b, 102j, and 102k may be configured to play audio content in synchrony as individual playback devices, as one or more bonded playback devices, as one or more consolidated playback devices, or any combination thereof. Similarly, in the case of the master bedroom, playback devices 102f and 102g may be configured to play audio content in synchrony as individual playback devices, as a bonded playback device, or as a consolidated playback device.

In one example, one or more playback zones in the environment of FIG. 1 may each be playing different audio content. For instance, the user may be grilling in the balcony zone and listening to hip hop music being played by the playback device 102c while another user may be preparing food in the kitchen zone and listening to classical music being played by the playback device 102i. In another example, a playback zone may play the same audio content in synchrony with another playback zone. For instance, the user may be in the office zone where the playback device 102d is playing the same rock music that is being playing by playback device 102c in the balcony zone. In such a case, playback devices 102c and 102d may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100 may be dynamically modified, and in some embodiments, the media playback system 100 supports numerous configurations. For instance, if a user physically moves one or more playback devices to or from a zone, the media playback system 100 may be reconfigured to accommodate the change(s). For instance, if the user physically moves the playback device 102c from the balcony zone to the office zone, the office zone may now include both the playback device 102d and the playback device 102c. The playback device 102 may be paired or grouped with the office zone and/or renamed if so desired via a control device such as the control devices 104a and 104b. On the other hand, if the one or more playback devices are moved to a particular area in the home environment that is not already a playback zone, a new playback zone may be created for the particular area.

Further, different playback zones of the media playback system 100 may be dynamically combined into zone groups or split up into individual playback zones. For instance, the dining room zone and the kitchen zone may be combined into a zone group for a dinner party such that playback devices 102i and 102l may render audio content in synchrony. On the other hand, the living room zone may be split into a television zone including playback device 102b, and a listening zone including playback devices 102a, 102j, and 102k, if the user wishes to listen to music in the living room space while another user wishes to watch television.

In some implementations, the playback devices 102 of media playback system 100 may be arranged into a smart home hierarchy referred to as Home Graph. The base unit of the home graph hierarchy is a "Set." For the purpose of this disclosure, a "Set" refers to an individual device or multiple devices that operate together in performing a given function. For instance, a bonded zone of audio playback devices (e.g., a stereo pair or surround sound configuration) function together in playing back audio content by playing back respective channels or portions of that content. As another example, multiple smart lightbulbs in the same light fixture function together in providing illumination from that light fixture. To individually control different smart devices, each of these smart devices may be assigned into a respective Set.

The next level of the Home Graph hierarchy is a "Room." Under the example home graph hierarchy described herein, a "Room" can be considered a container for Sets in a given room of a home. For example, an example Room might correspond to the kitchen of a home, and be assigned the name "Kitchen." The afore-mentioned Sets having the names "Kitchen Island" and "Kitchen Lights" may belong to the Room.

Under home graph, Sets within the room container may be referred to by the name of the room. For instance, the voice command "Play music in Kitchen" causes the "Kitchen Island" Set (which includes an audio playback device) to start playing music. If there are multiple Sets in the Kitchen that include audio playback devices, the voice command "Play music in Kitchen" invokes every Set in the "Kitchen" Room that includes an audio playback device. If control of an individual Set is desired, that Set may be selected by reference to its name (e.g., "Kitchen Island") rather than the name of the Room.

The next level of the example home graph hierarchy is "Area." Many homes are naturally divided into areas, such as upstairs and downstairs. Under a first example implementation of home graph, an Area includes two or more rooms. For instance, a user may pre-define two Areas named "upstairs" and "downstairs," which include the Rooms upstairs and the Rooms downstairs in the home, respectively. Under a second example, an area contains two or more sets (possibly in different Rooms).

The highest level of the home graph hierarchy is "Home." A Home refers to the entire home, and all of the Sets within. In some implementations, the Home may be referred to by reference to "everywhere." For the purposes of this disclosure, the terms "Set," "Room," "Area" and "Home" are capitalized when referring to levels of the home graph hierarchy so as to distinguish from the common usage of these terms. Moreover, human-readable names (i.e., character strings) are used in identifying Sets, Rooms, Areas, and Home and are denoted by quotations marks (e.g., "Nick's Room" Set).

c. Example Control Devices

Figure 3A:
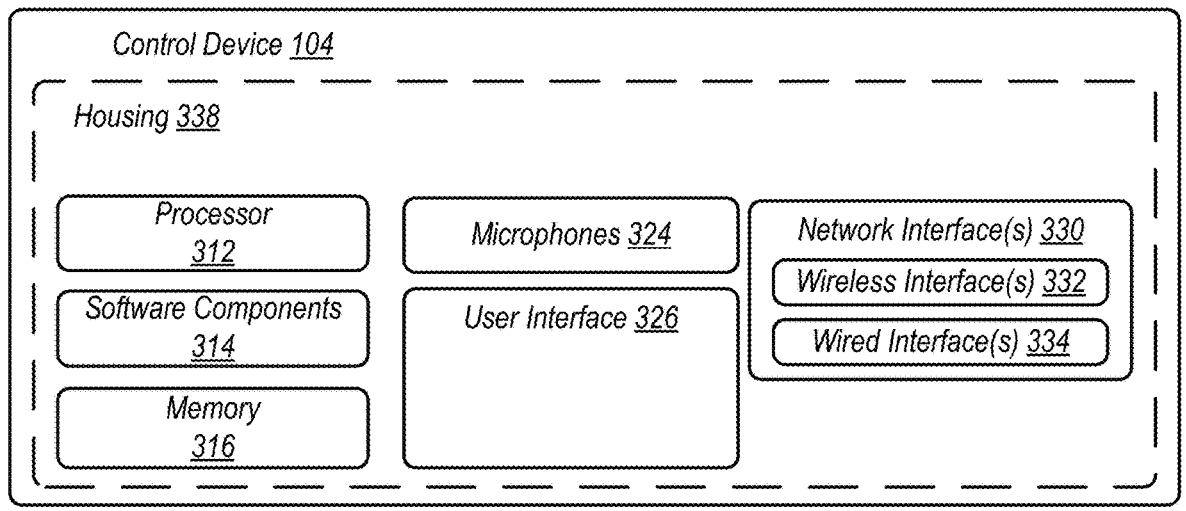
FIG. 3A shows a functional block diagram of an example control device in accordance with aspects of the disclosure.

FIG. 3 is a functional block diagram illustrating certain aspects of a selected one of the controller devices 104 of the media playback system 100 of FIG. 1. Such controller devices may also be referred to as a controller or a control device. The controller device 104 shown in FIG. 3 may include components that are generally similar to certain components of the network devices described above, such as a processor 312, memory 316, and a network interface 330. In one example, a controller device may be a dedicated controller for the media playback system 100. In another example, a controller device may be a network device on which media playback system controller application software (a "controller app") may be installed, such as for example, an iPhone™, iPad™ or any other smart phone, tablet or network device (e.g., a networked computer such as a PC or Mac'). The control device 104 includes a housing 338 carrying its constituent components.

The memory 316 of the control device 104 may be configured to store controller application software and other data associated with the media playback system 100 and a user of the system 100. The memory 316 may be loaded with one or more software components 314 executable by the processor 312 to achieve certain functions, such as facilitating user access, control, and configuration of the media playback system 100. The control device 104 communicates with other network devices over the network interface 330, such as a wireless interface, as described above.

The control device 104 may include a plurality of microphones arranged to detect sound in the environment of the control device 104. The microphones may detect voice inputs to the media playback system 100, process those inputs, perhaps using one or more VASs, and carry out the commands on one or more playback devices 102.

Playback device control commands such as volume control and audio playback control may also be communicated from a control device to a playback device via the network interface 330. As suggested above, changes to configurations of the media playback system 100 may also be performed by a user using the control device. The configuration changes may include adding/removing one or more playback devices to/from a zone, adding/removing one or more zones to/from a zone group, forming a bonded or merged player, separating one or more playback devices from a bonded or merged player, among others.

In one example, data and information (e.g., such as a state variable) may be communicated between a control device and other devices via the network interface 330. For instance, playback zone and zone group configurations in the media playback system 100 may be received by a control device from a playback device, another control device, or another network device, or transmitted by the control device to another playback device or control device via the network interface 330. In some cases, the other network device may be another control device.

Figure 3B:
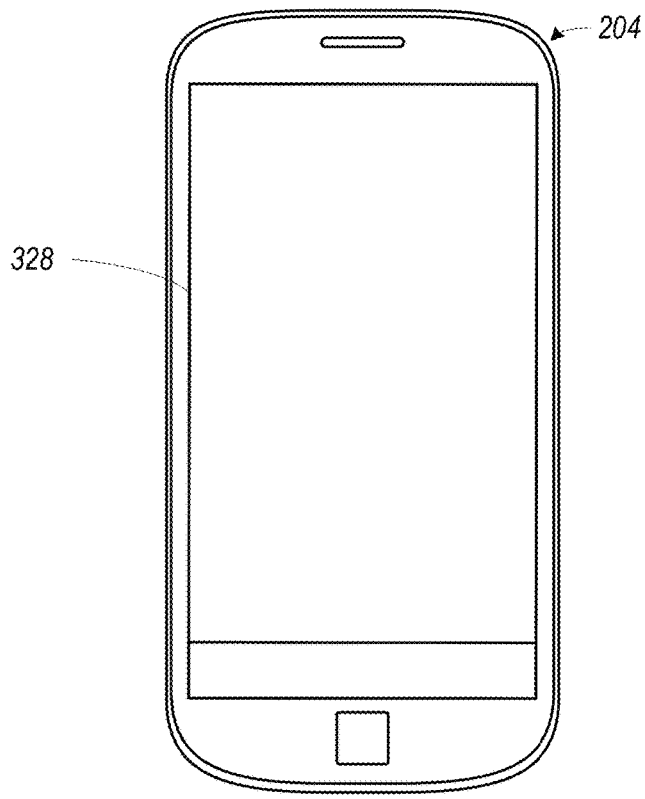
FIG. 3B is a diagram of an example control device in accordance with aspects of the disclosure.

FIG. 3B is an isometric diagram showing an example control device 204. As shown, control device 204 includes a touch-sensitive display, on which user interface(s) 326 are displayed. The user interface(s) 326 of a control device may be configured to facilitate user access and control of the media playback system 100, by providing controller interface(s) such as the controller interfaces 326a and 326b shown in FIGS. 4A and 4B, respectively, which may be referred to collectively as the controller interface 326.

Figures 4A, 4B:
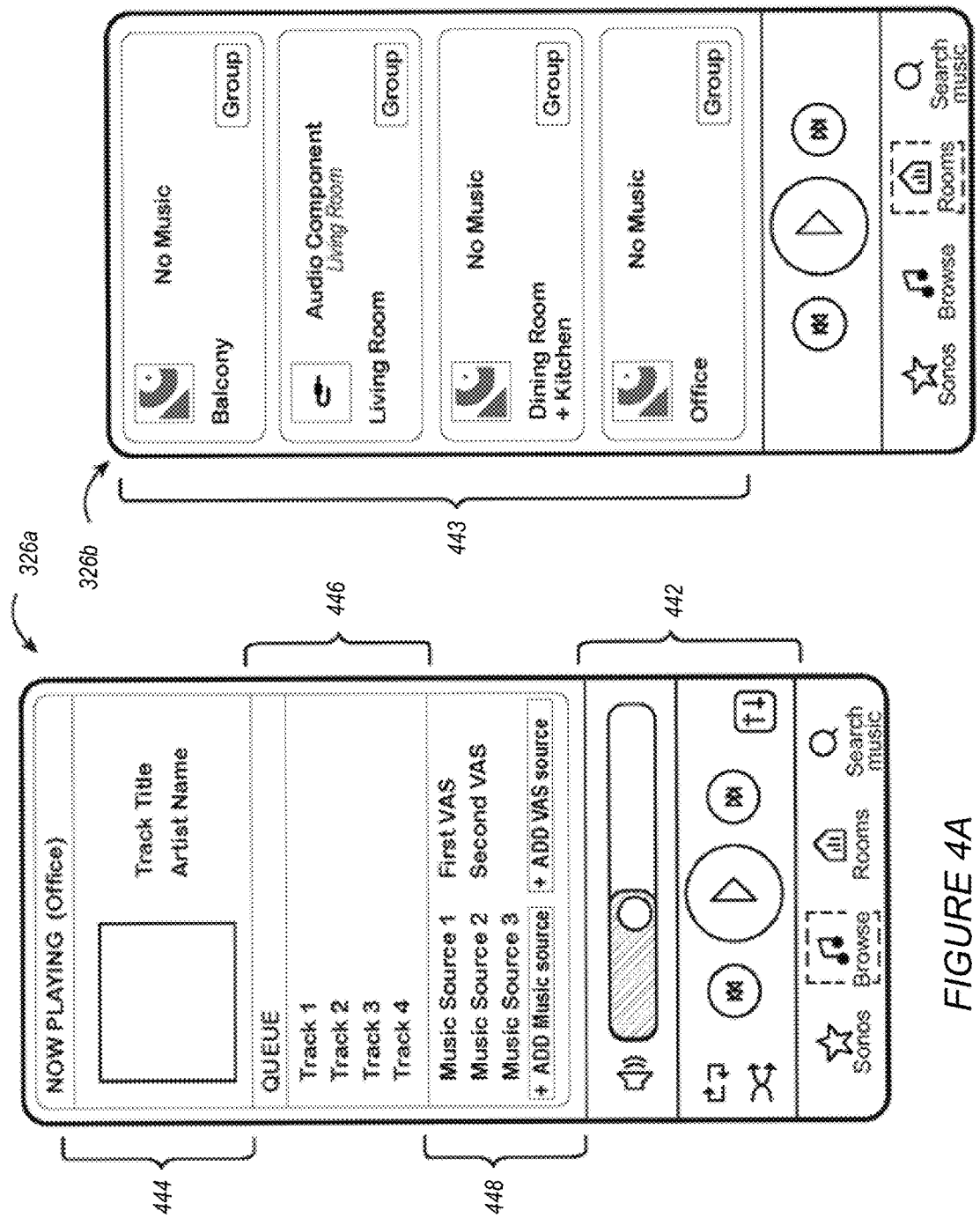
FIGS. 4A and 4B are example controller interfaces in accordance with aspects of the disclosure.

Referring to FIGS. 4A and 4B together, the controller interface 326 includes a playback control region 442, a playback zone region 443, a playback status region 444, a playback queue region 446, and a sources region 448. The user interface 326 as shown is just one example of a user interface that may be provided on a network device such as the control device shown in FIG. 3 and accessed by users to control a media playback system such as the media playback system 100. Other user interfaces of varying formats, styles, and interactive sequences may alternatively be implemented on one or more network devices to provide comparable control access to a media playback system.

The playback control region 442 (FIG. 4A) may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 442 may also include selectable icons to modify equalization settings, and playback volume, among other possibilities.

The playback zone region 443 (FIG. 4B) may include representations of playback zones within the media playback system 100. The playback zones regions may also include representation of zone groups, such as the Dining Room+Kitchen zone group, as shown. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 326 are also possible. The representations of playback zones in the playback zone region 443 (FIG. 4B) may be dynamically updated as playback zone or zone group configurations are modified.

The playback status region 444 (FIG. 4A) may include graphical representations of audio content that is presently being played, previously played, or scheduled to play next in the selected playback zone or zone group. The selected playback zone or zone group may be visually distinguished on the user interface, such as within the playback zone region 443 and/or the playback status region 444. The graphical representations may include track title, artist name, album name, album year, track length, and other relevant information that may be useful for the user to know when controlling the media playback system via the user interface 426.

The playback queue region 446 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

With reference still to FIGS. 4A and 4B, the graphical representations of audio content in the playback queue region 446 (FIG. 4B) may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device. Playback of such a playback queue may involve one or more playback devices playing back media items of the queue, perhaps in sequential or random order.

d. Example Audio Content Sources

The sources region 448 (FIG. 4A) may include graphical representations of selectable audio content sources and voice assistant services (VAS). The audio sources in the sources region 348 may be audio content sources from which audio content may be retrieved and played by the selected playback zone or zone group. One or more playback devices in a zone or zone group may be configured to retrieve for playback audio content (e.g., according to a corresponding uniform resource identifier (URI) or uniform resource locator (URL) for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a control device, a network-enabled personal computer, or a networked-attached storage (NAS), for example), streaming audio services providing audio content via the Internet (e.g., the cloud), or audio sources connected to the media playback system via a line-in input connection on a playback device or network devise, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

III. Example Media Playback Systems in a Place of Accommodation

Figure 5:
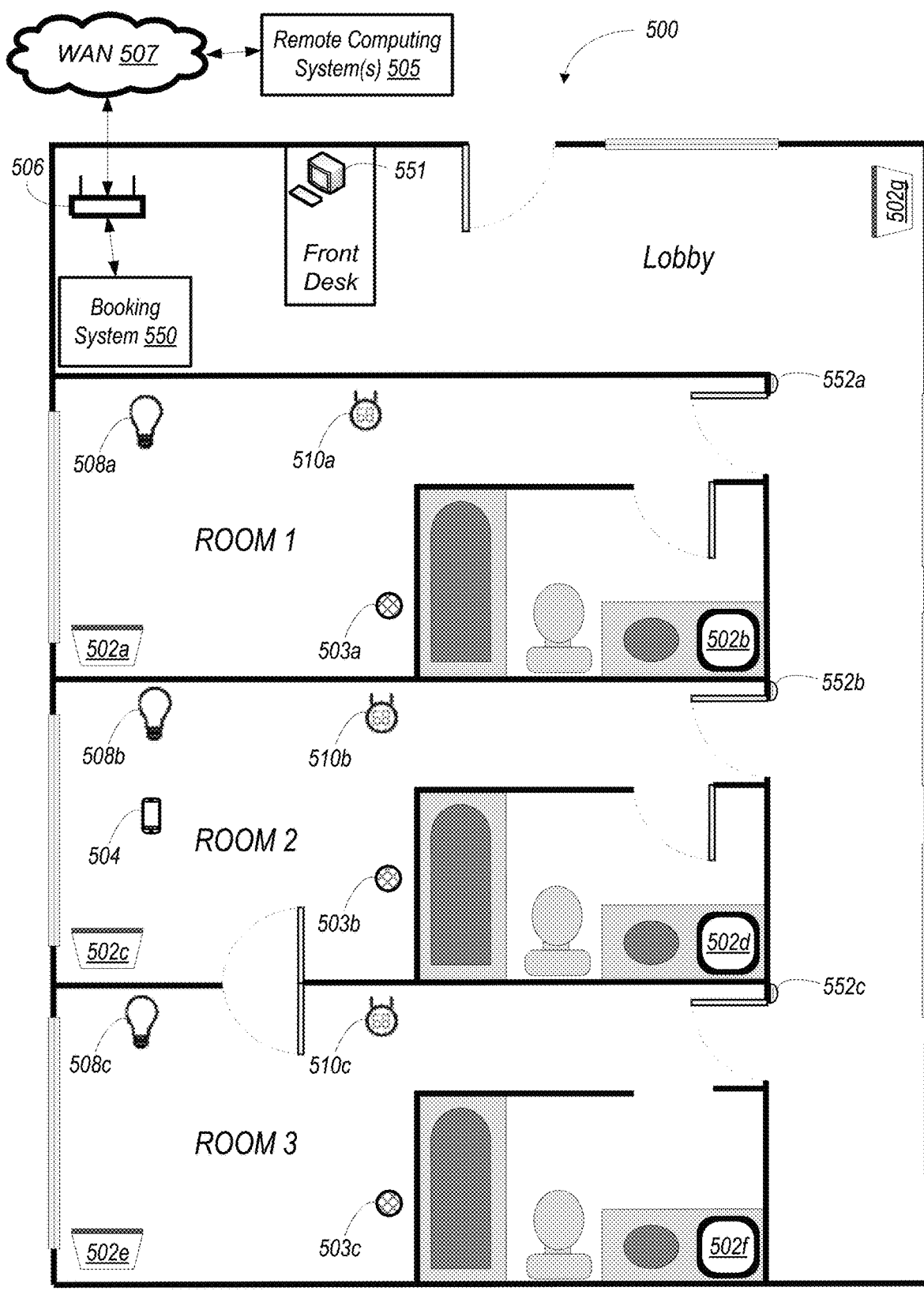
FIG. 5 shows an example media playback system configuration within a place of accommodation in which certain embodiments may be practiced.

FIG. 5 illustrates an example configuration of a system 500 in which one or more embodiments disclosed herein may be implemented. As shown in FIG. 5, the system 500 is implemented in a place of accommodation (i.e., a hotel) having three guest rooms (Rooms 1, 2, and 3). The hotel also has a lobby with a front desk, to facilitate guest services such as check-in and check-out. The place of accommodation shown in FIG. 5 is representative of many different kinds of hotels, motels, bed & breakfasts, and other places of temporary lodging.

System 500 is similar in many aspects to media playback system 100. For instance, system 500 includes playback devices 502a-502g, which may be similar in components and functionality to the playback devices 102 of media playback system 100. The system 500 also includes NMDs 503a-c and control device 504, which may be similar in components and functionality to the NMDs 103 and control device 104 of media playback system 100. In some instances, guests of a hotel may bring their personal devices (e.g., smartphones or tablets) with them to the hotel, in which case the control device 504 may be the same physical device as control device 104 of the media playback system 100.

In example implementations, the playback devices in each guest room are configured as a separate media playback system with a respective HHID. For instance, the system 500 may include media playback systems 500*a*, 500*b*, and 500*c* in rooms 1, 2, and 3, respectively. For instance, the media playback system 500*a* in room 1 includes the playback devices 502*a* and 502*b* and NMD 503*a*. Similarly, the media playback system 500*b* and 500*c* include respective playback devices and NMDs, as shown. Each room may include other network devices, such as one or more smart illumination devices 508*a-c* and smart thermostats 110*a-c*. Configuring the playback devices 502 within each guest room as respective media playback systems facilitates individual control and playback of that system by the guest(s) within each room. In the lobby, playback device 502*f* may be configured as another media playback system 500*d*.

Also shown in FIG. 5 is a network router 506, which provides a network that interconnects the network devices of system 500. Network router 506 connects to a WAN 507, which may be the same network as WAN 107 (i.e., the Internet). Remote computing systems 505 represent one or more servers configured to provide one or more cloud-based services, such as streaming audio services, voice assistant services, and the like. The remote computing device(s) 105 may also be representative of cloud-based booking systems of one or more places of accommodation, including the hotel shown in FIG. 5. The remote computing device(s) 105 may further be representative of cloud-based services provided by the manufacturer of the playback devices 102 to facilitate additional features of the media playback system(s) in the place of accommodation. One or more of the remote computing device(s) 505 may be the same as the remote computing devices 105 shown in FIG. 1.

In an example, a user (e.g., Nick) of the media playback system 100 shown in FIG. 1 books a room (e.g., room 2) at the hotel shown in FIG. 5 using a booking system 550, which includes one or more servers configured to maintain room reservations for one or more places of accommodation. Although the booking system 550 is shown by way of example as being within the hotel, the booking system 550 may also be cloud-based and implemented on remote computing systems 505. For instance, the booking system 550 may represent a cloud-based system of a hotel chain (e.g., Marriot®, Hilton®, or Hyatt®, among other examples). In other examples, the booking system 550 may represent a cloud-based system of a third party travel site, such as Priceline®, which facilitates room reservations for a plurality of different places of accommodation.

In various examples, the booking system 550 is accessible via a web interface or via a booking application or app (e.g., a smartphone or tablet app). Room reservations and other information of a given user may be stored within a user account of the booking system 550. For instance, a user of media playback system 100 may log into the booking system 550 via an application on the control device 104*a* (e.g., Nick's smartphone) and book a room at the hotel shown in FIG. 5. In another example, the user may call the hotel front desk and a hotel employee may book a room for the user using the terminal 551. Other examples are possible as well.

In advance of the guest's stay, a guest may opt-in to associating their user profile of their media playback system with their hotel user account. For instance, the user of media playback system 100 may link their user profile of the media playback system 100 (e.g., Nick's user profile) to their user account of the booking system 550 (e.g., Nick's hotel account), perhaps using the web interface or app of the booking system 550. Alternatively, the user of media playback system 100 may link their user account of the booking system 550 to their user profile of the media playback system 100, perhaps using user interface 326 of the control device 104.

Figure 6:
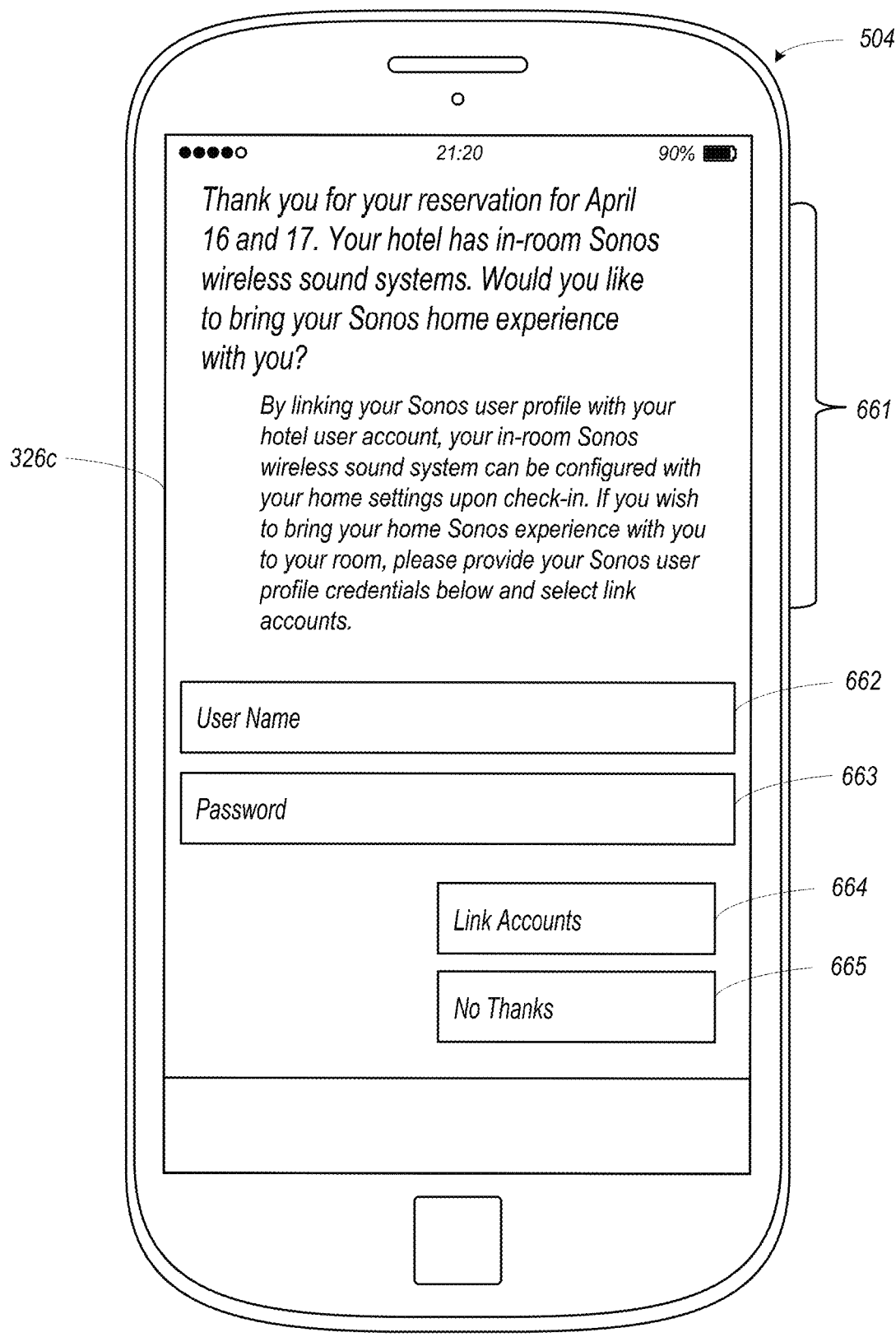
FIG. 6 is an example user interface in accordance with aspects of the disclosure.

To illustrate, FIG. 6 shows a controller interface 326*c* displayed on control device 504. As noted above, the control device 504 represents a guest's personal device and may have similar or the same components and functionality as control devices 104 and 204 shown in FIGS. 1, 3A, and 3B. In some instances, the user brings along their personal device when they become a guest of the hotel and the control device 504 is the same physical device as the control device(s) 104 shown in FIG. 1.

As shown, controller interface 326*c* includes a prompt 661 indicating that the hotel includes in-room wireless sound systems (e.g., playback devices 502*a-f* shown in FIG. 5). Prompt 661 further indicates that the media playback system in the guest's room (i.e., the media playback system 500*b*) can be configured with the guest's home settings upon check-in. Controller interface 326*c* further includes controls 662 and 663 for entry of a guest's credentials for the user profile of their media playback system. After providing credentials, selection of selectable control 664 causes the control device 504 to send the credentials to the remote computing system(s) 505 shown in FIG. 5, which create a link between the guest's user profile of their media playback system and their hotel user account. Alternatively, selection of selectable control 665 opts-out of creating such an association.

As noted above, check-in of a guest to a room may trigger configuration of the media playback system within that room with the guest's home settings. In some examples, the check-in status of a guest to a room for a given reservation is represented in booking system 550 as a state variable. In some cases, a guest may check-in at the front desk by speaking with a hotel employee. The hotel employee may access booking system 550 using terminal 551 to check the guest into their room, which change the state variable for that room to indicate that the guest is now checked-in to that room. Alternatively, a guest may check themselves in using the web interface or smartphone app of the booking system 550. In yet further examples, the booking system 550 triggers configuration of the media playback system in a given room with a guest's home settings at the time that check-in becomes available (e.g., 3 PM).

In various examples, the playback devices 502*c* and 502*d* and/or the NMDs 503 may output an audible welcome notice indicating that the media playback system 500*b* is configured with the home settings of the guest's media playback system 100. For example, when a guest (e.g., Nick) enters room 2, the playback devices 502*c* and 502*d* and/or the NMDs 503 of the media playback system 500*b* may output "Hello Nick, welcome to room 2, your Sonos system is ready." Such a message may be output via a voice assistant service configured with the guest's home media playback system, perhaps by getting information on the guest's reservation via the booking system 550.

Configuration of the media playback system in a given room with a guest's home settings involves the system 500 retrieving the home settings (e.g., system configuration) of the guest's media playback system from the guest's home media playback system 100 or the remote computing system(s) 505 that are maintaining the guest's user profile. For instance, if the user of the media playback system 100 check-ins to room 2, the system 500 may query the remote servers 505 for a user profile corresponding to the HHID of the media playback system 100. The system 500 may have previously obtained this HHID through the user providing the credentials of their user profile to link the user profile of their media playback system to their user account of the booking system 550.

In alternative examples, the media playback system in the guest's room might not know the HHID of the guest's home media playback system in advance of the guest entering the room. In such examples, a guest's personal device (e.g., smartphone or tablet) may exchange messages with the media playback system in the guest's room to transfer the HHID of the guest's home media playback system from the personal device to the media playback system. The guest's personal device may have the HHID of the guest's home media playback system stored in memory thereon as the personal device operates as a control device 104 when connected to the media playbacks system 100.

Figure 7:
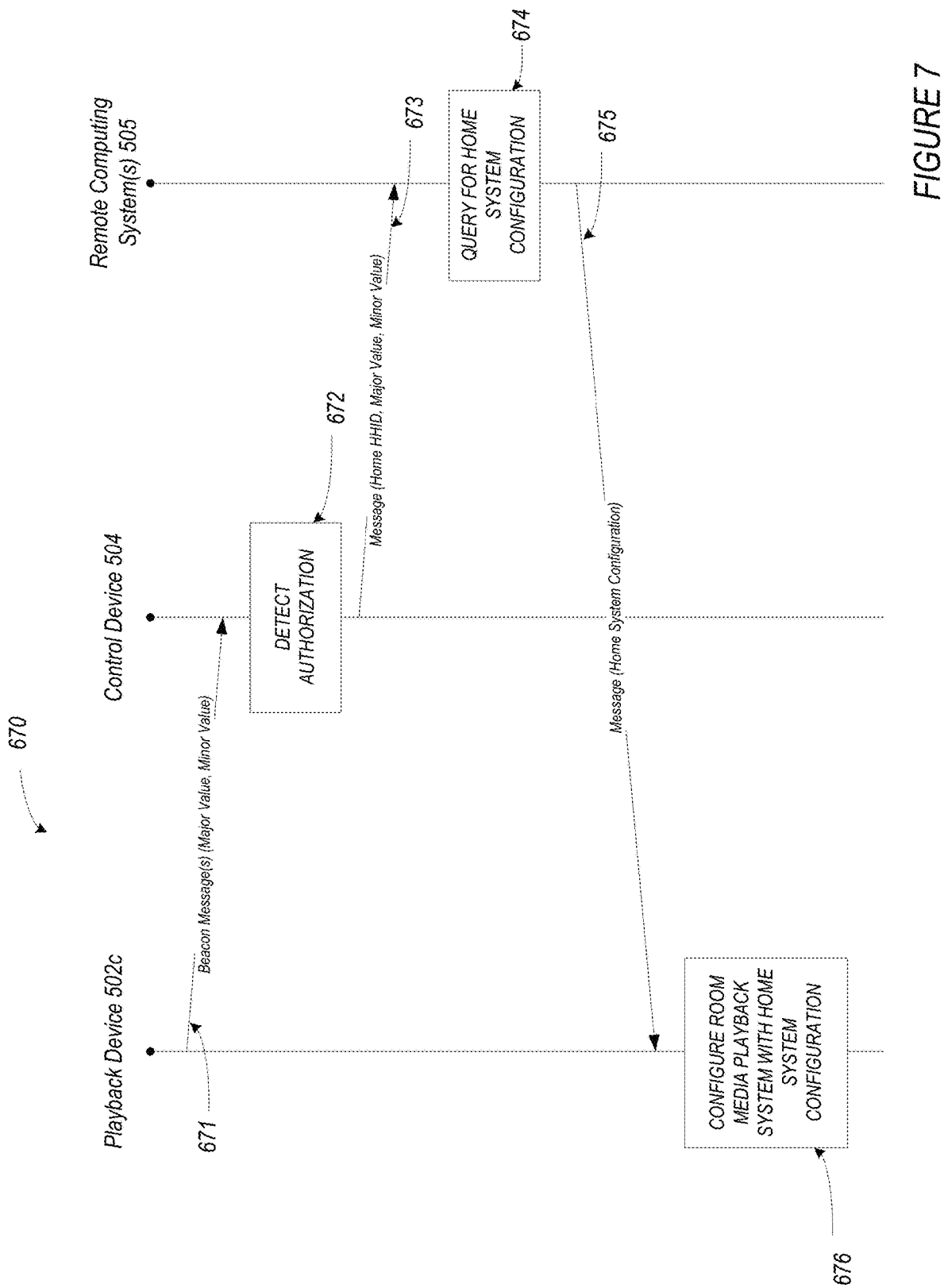
FIG. 7 is an example message flow diagram in accordance with aspects of the disclosure.

To illustrate, FIG. 7 is a message flow diagram 670 showing transmissions exchanged between the control device 504 and the playback device 502c of the media playback system 500b. Such messages are representative and example implementations that use additional or fewer messages are contemplated. Moreover, such messages could be exchanged between the guest's personal device and other network devices of the media playback system 500b (e.g., the playback device 502d or the NMD 503b).

At 671, the playback device 504b emits a beacon message, which is detected by the control device 504. An application (such as a control app for media playback system 100 or a booking app) may configure control device 504 to monitor for such beacon messages, perhaps as part of a background process. In some implementation, the playback device 504b repeatedly emits the beacon message (e.g., periodically) to facilitate detection by various control devices 504 when such devices become present in the room.

The beacon message may include an identifier (e.g., a HHID) that identifies the playback device 502c as being part of the media playback system 500b. In some implementations, the beacon message includes major and minor values to facilitate identification of playback device 502c. For instance, the major value may be a universally unique identifier that identifies the hotel and the minor value may identify the room number. Such values may be configured during installation of the playback device(s) 502 within each room.

The beacon message may be transmitted via Bluetooth® or WiFi®, among other wireless standards and/or protocols. In some implementations, to help minimize false detections of beacons emitted by playback device(s) in adjacent rooms, the beacon message may use Bluetooth Low-Energy (LE) to reduce signal propagation distance. Yet further, the beaconing signal may be directional (e.g., via a directional antenna) to help minimize false detections. As another example, the walls of the room may attenuate the beaconing signals to minimize false detections.

Other steps may be taken as well to prevent and/or minimize false positive detection of beacon signals. For instance, in an implementation in which the controller app of the media playback system is configured to detect the beacons, this controller app may receive the major and/or minor values corresponding to the guest's reservation from the booking app. Then, in this example, the control device 504 may be configured to respond only to beacon messages with these values. As another example, in an implementation in which the booking app is configured to detect the beacons, the booking app may query the major and/or minor values corresponding to the guest's reservation from the booking system 550, so as to facilitate responding only to beacon messages with these values.

Based on detecting a beacon message, the control device 504, at 672, detects whether authorization has been given to share data between the user's home media playback system and the media playback system in the place of accommodation. In some instances, such authorization may have been previously obtained via the controller app of the media playback system or via an interface to the booking system 550. Alternatively, the control device 504 displays a prompt to obtain authorization for the data sharing, perhaps via the controller app or the booking app. In various implementations, the prompt is displayed on a lock screen of the control device 504 or via a push notification on the control device 504.

Figure 8:
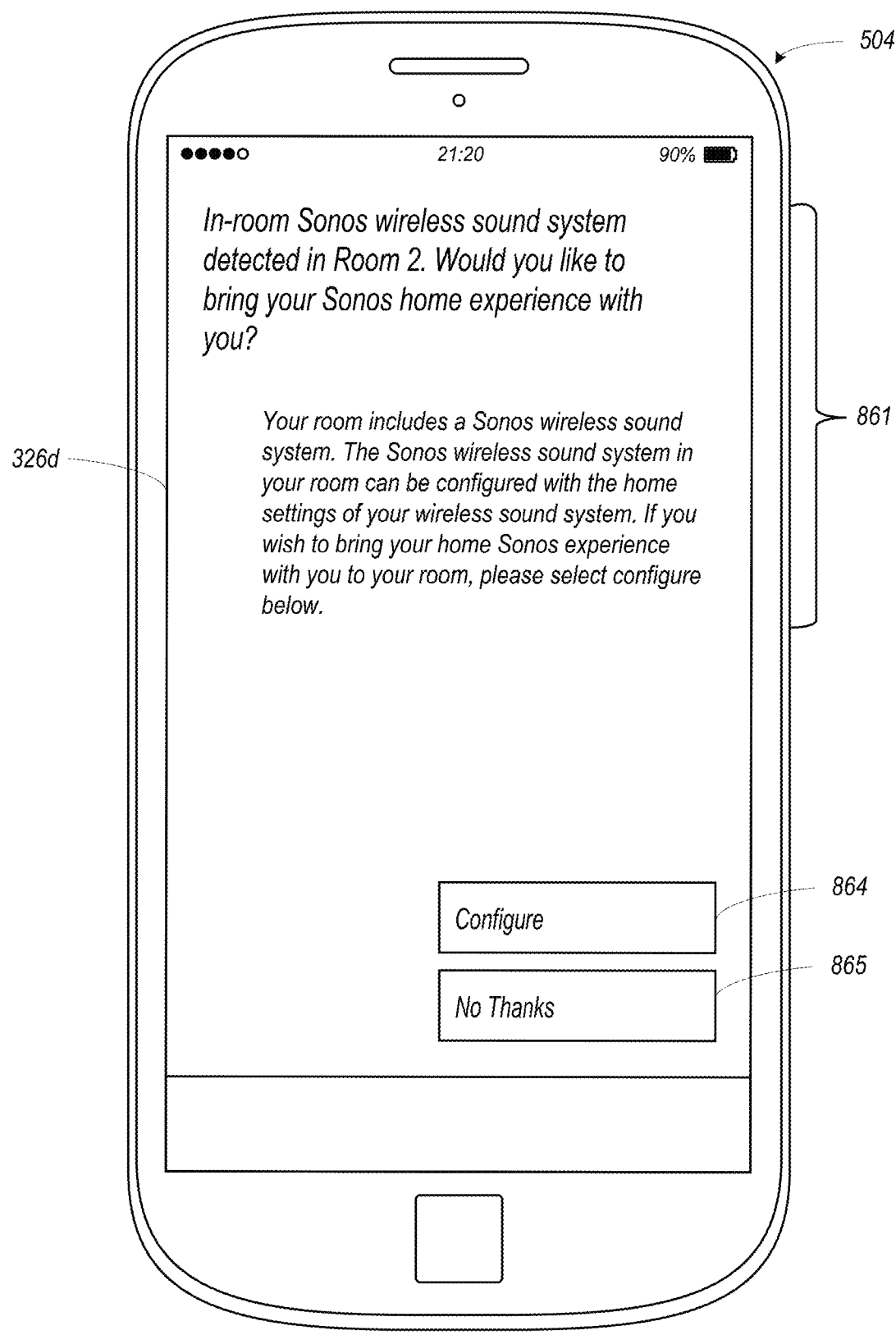
FIG. 8 is an example user interface in accordance with aspects of the disclosure.

To illustrate such a prompt, FIG. 8 shows a controller interface 326d displayed on control device 504. As shown, the controller interface 326d includes a prompt 861 indicating that the control device 504 has detected that the guest's room includes an in-room wireless sound system (i.e., the media playback system 500b). Prompt 861 further indicates that the media playback system in the guest's room can be configured with the guest's home settings. Selection of selectable control 864 causes the control device 504 to request that the guest's home system configuration be shared with the media playback system 500b. Alternatively, selection of selectable control 865 opts-out of such data-sharing.

Returning to FIG. 7, at 673, the control device 504 send a message to the remote computing system(s) 505. The message includes the HHID of the guest's home media playback system 100 to enable the remote computing system(s) 505 to retrieve the system configuration of the media playback system 100 from the media playback system 100 or from a cloud-based service that maintains system configurations for a plurality of media playback systems including the media playback system 100. The message may also include the major and minor values to identify the media playback system that is to be configured with the system configuration of the media playback system 100 (i.e., the media playback system 500b).

At 674, the remote computing system(s) 505 query for the home system configuration of the media playback system 100. For instance, the remote computing system(s) 505 may query a database for system configuration stored in association with the HHID of the media playback system 100. As another example, the remote computing system(s) 505 may query one or more servers of a cloud-based service that maintains system configurations for a plurality of media playback systems. Such servers of the cloud-based service may query a database for system configuration stored in association with the HHID of the media playback system 100.

At 675, the remote computing system(s) 505 send one or more messages to the playback device 502c. The messages represent the home system configuration of the media playback system 100 (or portions thereof). For instance, the remote computing system(s) 505 may send an XML file that represents the home system configuration of the media playback system 100.

At 676, after receiving the message(s) representing the home system configuration of the media playback system 100, the playback device 502c configures the media playback system 500b within the guest's room with the home settings of the media playback system 100.

In some implementations, configuring the media playback system 500b within the guest's room with the home settings of the media playback system 100 involves registering the streaming audio service(s) that have been registered with the media playback system 100. To set-up a given streaming audio service (e.g., Spotify® or Pandora®, among others, the user(s) of the media playback system 100 may provide credentials (e.g., user name and password) for one or more user accounts of the streaming audio service) to enable streaming audio from that service to the playback devices 102 of the media playback system 100. These credentials may be stored in the system configuration of the media playback system 100 and set-up on the media playback system 500b in the guest's room. For instance, the portions of the system configuration of the media playback system 100 that represent the streaming audio service registrations of the media playback system 100 may be copied into the system configuration of the media playback system 500b in the guest's room. This causes the media playback system 500b in the guest's room to have the same streaming audio service registrations as the media playback system 100 in the guest's home.

In further examples, configuring the media playback system 500b with the home settings of the media playback system 100 involves registering the voice assistant service(s) that have been registered with the media playback system 100. To set-up a given voice assistant service (e.g., Amazon Alexa® or Apple Siri®), the user(s) of the media playback system 100 may provide credentials (e.g., user name and password) for one or more user accounts of the voice assistant service to enable voice assistant commands from the NMD(s) 103 of the media playback system 103 to the voice assistant service. To propagate registration of these voice assistant services to the media playback system 500b, the media playback system 500b may copy registration information (e.g., services and corresponding credentials) from the system configuration of the media playback system 100 into the system configuration of the media playback system 500b.

Within examples, configuring the media playback system 500b within the guest's room with the home settings of the media playback system 100 involves propagating user customization settings to the media playback system 500b within the guest's room. User customization settings may include favorites (e.g., playlists, artists, albums, songs, books, and other audio content that have been designated as favorites within a user profile of the media playback system 100 (e.g., Nick's user profile)). Propagation of these user customization settings may involve copying the relevant portions of the system configuration of the media playback system 100 into the corresponding portions of the system configuration of the media playback system within the guest's room.

Some user customization settings may be zone-specific. For instance, a user (Nick) may designate different favorites in different zones, perhaps because the user prefers to listen to classical music in the Office zone and pop music in the Living Room zone. As another example, a user may set an alarm (e.g., to play given audio content at 7 AM) in a particular zone (e.g., in a bedroom such as Nick's Room). In another example, a user may set different default music in each zone such that if the user starts playback of music in that zone (e.g., by speaking a voice command to "Play Music") the playback device(s) 102 in that zone start to play that default music. These examples are illustrative and other zone-specific user customization settings are contemplated.

After propagating such settings, the media playback system 500b within the guest's room presents the same or similar experience as the media playback system 100 within the guest's home. For instance, when the control device 504 displays user interface 326a while connected to the media playback system 500b, the sources region 448 (FIG. 4A) shows the same graphical representations of the selectable audio content sources and voice assistant services (VAS) that are shown on control device 104 when user interface 326a is displayed for controlling media playback system 100. Similarly, alarms sound at the same time (perhaps adjusted by time zone) with the same audio content. Browsing or searching the user's favorites using the user interface 326 presents the same favorites. Other aspects of the home experience described above in connection with the media playback system 100 may propagate as well.

In some aspects, the media playback system within the guest's room may present a different experience as compared with the media playback system 100 within the guest's home. For instance, the media playback system 500b within the guest's room may include a different number or configuration of zones as compared with the user's home media playback system 100. In particular, the media playback system 500b within room 2 might include a Bedroom zone (playback device 502c) and a Bathroom zone (playback device 502d). As such, when the control device 504 displays user interface 326b while connected to the media playback system 500b, the playback zone region 443 (FIG. 4B) shows these two zones instead of the zones of the media playback system 100.

Given such differences, configuring the media playback system 500b within the guest's room with the home settings of the media playback system 100 may involve modifying the home settings of the media playback system 100 to suit the media playback system 500b in the guest's room. In some examples, configuring the media playback system 500b may involve identifying the zones of the media playback system 100 that most closely match the zones of the media playback system 500b. For instance, settings from the master bedroom zone (i.e., Nick's Room) and the Bathroom zone of the media playback system may be propagated to the Bedroom and Bathroom zones, respectively, of the media playback system 500b. In further examples, configuring the media playback system 500b may involve combining or consolidating settings from multiple zones of the media playback system 100 into a single zone of the media playback system 500b. For example, settings from the bedroom zones (i.e., Nick's Room and Bedroom) may be combined and propagated to the Bedroom zone of the media playback system 500b.

In further examples, two of the guest rooms may be adjoining (albeit separated by double doors) so to facilitate access between the two guests rooms without entering the common hallway, which is may be a preferred arrangement for parents traveling with children, for example. In such examples, the network devices of both rooms may be configured as a single media playback system. Since this two-room media playback system includes additional playback devices 502, settings from the media playbacks system 500 may be propagated differently than in a single room reservation.

For instance, Nick and his son Nick Jr. may check-in to rooms 2 and 3, respectively, under a single reservation. In such an example, settings from the master bedroom zone (i.e., Nick's Room) and the Bedroom zone of the media playback system 100 may be propagated to the Bedroom zones of rooms 2 and 3, respectively. In some examples, this propagation may be determined by user profiles (e.g., Nick and Nick Jr.'s respective user profiles) associated with each zone within the system configuration of the media playback system 100. Alternatively, a guest may use the controller app or the booking app to set the propagation of each zone into the available zones of the booked room(s). Continuing the example above, since there is only one Bathroom zone in the media playback system 100, settings from the Bathroom zone of the media playback system 100 may be propagated to the Bathroom zones of both rooms 2 and 3, respectively.

In some examples, only the settings associated with certain user profiles are propagated from the media playback system 100 to the media playback system 500b in the guest's room. For instance, if Nick (but not Nick Jr.) is staying at the hotel, only settings corresponding to Nick's user profile (e.g., Nick's favorites) are propagated from the media playback system 100 to the media playback system 500b. Yet further, a given household might have multiple user accounts to a given streaming audio service. In some examples, each user account of a given service (e.g., streaming audio services and voice assistant services) are associated with a given user profile of the media playback system, which facilitates propagating the user accounts that correspond to the guest(s) staying in the hotel.

As noted above, during a guest's stay in a room, the media playback system in that room may temporarily adopt the settings, playlists, favorites, services and other customization options (collectively referred to as "home settings") that are configured with a guest's media playback system in their home. For instance, the media playback system in that room may set-up user accounts of one or more streaming audio services that are configured with the guest's media playback system in their home. As another example, the media playback system in that room may include multiple zones (e.g., bedroom and bathroom) and configure those zones with respective settings of zones in the user's media playback system that correspond to those zone (e.g., master bedroom and bathroom). As a further example, if a guest's home media playback system has multiple profiles corresponding to different members of the household, the media playback system in that room may adopt settings of the user profile(s) that correspond to the guest(s) that are staying in the room.

In various implementations, smart home settings configured in the guest's home may be propagated to the guest's room at the hotel. As described above, the NMDs 103 that support one or more voice assistant services may be implemented within the playback devices 102 or operate in concert with the playback devices 102 to facilitate voice control of the playback devices 102 other network devices within the home (e.g., smart illumination devices 108 and a smart thermostat 110) using the one or more voice assistant services. A user profile of a voice assistant service may include one or more smart home settings that are propagated to the NMDs 503 within the guest's room.

For instance, the user Nick's may have a user account of a voice assistant service registered with his user profile of the media playback system 100. Nick may have previously configured various smart home settings, such as calendars, notifications, voicemail, and smart appliance settings in this user account. Within examples, voice assistant functionality is cloud-based in that voice commands received by the NMDs 103 are transmitted to one or more servers of a voice assistant service. Such servers may provide a response to the voice command (e.g., a spoken response or an instruction). Given such cloud-based functionality, propagation of smart home settings implemented within a voice assistant service may be propagated by registering a user account of the voice assistant service with the NMDs 503 in the guest's room.

However, given that the guest's room is different from the guest's home, some smart home settings are not propagated to the NMDs 503 in the guest's room. For instance, smart home settings for smart home appliances that are not in the guest's room (e.g., set oven temperature of smart oven) are not propagated. Other examples are possible as well.

Other smart home settings are propagated. For instance, the media playback system 500b may propagate programming of the smart thermostat 110 to the smart thermostat 510b, perhaps by registering an account of a voice assistant service with the smart thermostat 510b. In some cases, the media playback system 500b may propagate settings of the smart illumination devices 108 to the smart illumination devices 508b. For instance, if Nick has a setting for a gradual wake up light in Nick's Room at home, the media playback system 500b may propagate the same setting to the smart illumination devices 508b. However, in other cases, such as if the smart illumination devices are associated with a zone or Room (e.g., Balcony) that is not present in the guest's room, such settings might not propagate.

In further examples, the system 500 may modify some smart home settings to enable the user to control smart home appliances at home while staying at the hotel. For instance, instead of speaking the voice command "turn off the bedroom lights" to turn off smart illumination devices in Nick's Room, the guest may need to speak the voice command "turn off the bedroom lights at home." The former voice command to "turn off the bedroom lights" may cause the NMDs 103 to turn off the smart illumination devices 510b.

Within examples, a place of accommodation may provide curated features. For instance, a hotel in Hawaii may curate an "Ahola Playlist" with Hawaiian music. In some implementations, such a playlist may be curated via a particular streaming music service, perhaps by partnering with the streaming audio service to create a playlist that is accessible via the streaming audio service.

At the beginning of a guest's stay in a given room (e.g., Nick's stay in room 2), such a playlist may be pre-configured on the media playback system 500 in that room, perhaps by populating a queue of one or more playback devices 502 in that room. Then, if a guest hits a play button on the user interface 226 of the playback device 502 or via the user interface 326 of the control device 504, the playback device(s) start playing back the curated playlist. In further examples, the curated playlist may be the default audio content that starts playing when a guest issues a voice command to "play music."

Some hotels may partner with specific services. For instance, the hotel shown in FIG. 5 might partner with Spotify® but not Apple Music® for streaming audio services, and partner with Amazon Alexa® and not Apple Ski® for voice assistant services. In such instances, the system 500 may prevent settings from non-partnered services from propagating to the network devices in each room.

To facilitate use of the partnered services, the booking app and/or the controller app on the control device 504 may display a prompt to register for such services. The prompt might be displayed via a push notification or a welcome screen, among other examples. The prompt may link to the service provider's website or app to facilitate registering with the partnered services, perhaps with a free trial or other promotion.

By propagating the user's home settings to the media playback system 500b in their room, the media playback system 500b in the guest's room becomes an interface to the guest's personal user profile and user accounts. To prevent unauthorized access to a guest's user profile and user accounts, the media playback system 500*b* may enter a restricted mode while the user is not in the room. In the restricted mode, features that may impact a user's privacy or safety, such as voice-based purchases, message sending, telephone, and calendar features of a voice assistant service are disabled. Similarly, control of a user's home media playback system 100 via NMDs 503 is disabled. Features that are available with or without propagating user profile or user account data, such as turning off playback, changing volume, or controlling lights remain enabled in this restricted mode.

Figure 9:
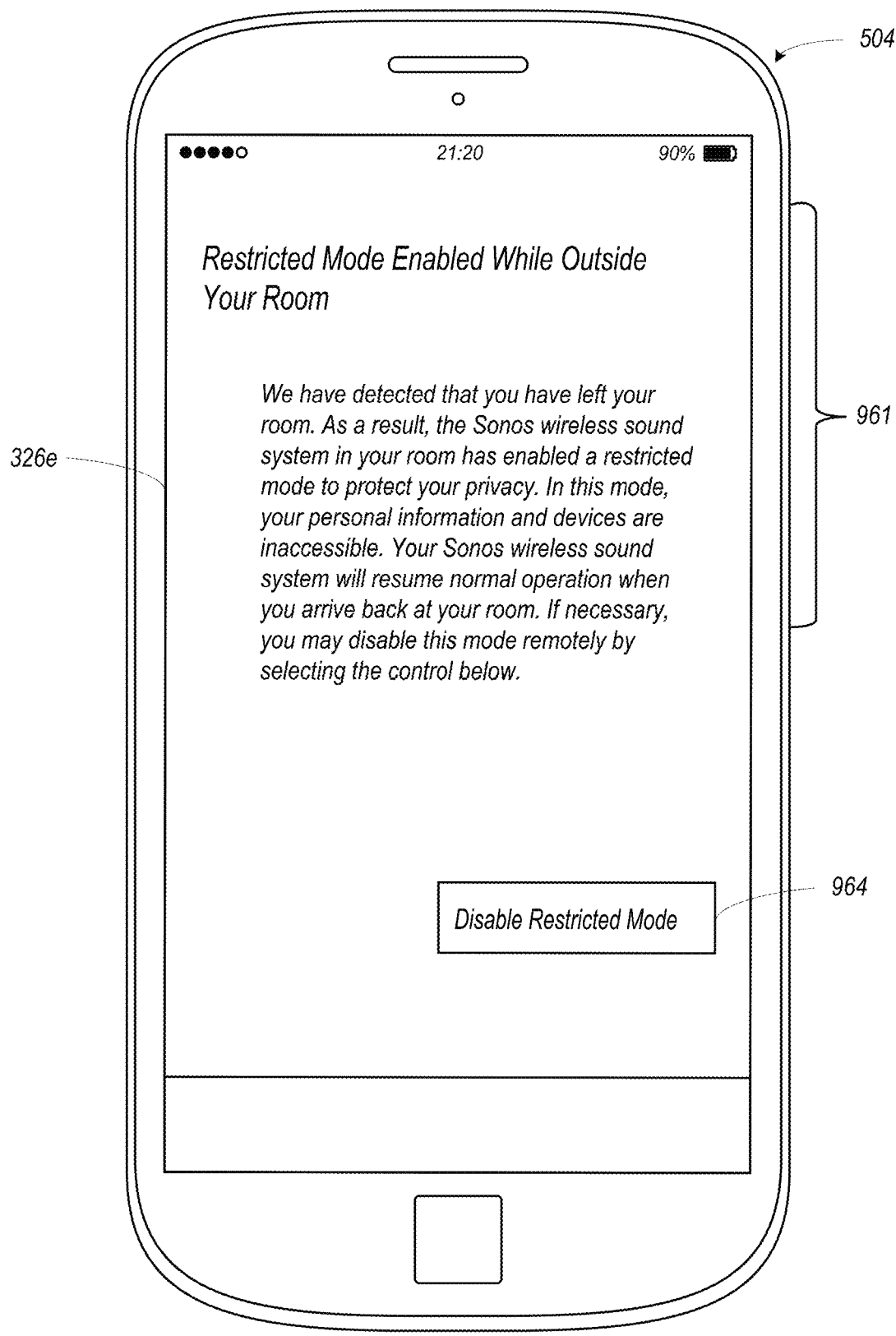
FIG. 9 is an example user interface in accordance with aspects of the disclosure.

While in this restricted mode, the control device 504 may display a prompt notifying the guest of the restricted mode, which may help ease the guest's concerns about unauthorized access to their personal information and devices. To illustrate such a prompt, FIG. 9 shows a controller interface 326*e* displayed on control device 504. As shown, the controller interface 326*e* includes a prompt 961 indicating that the system 500 has detected that the guest is outside of their room and a restricted mode is enabled. Prompt 961 further indicates that the restricted mode prevents unauthorized access to the guest's personal information and devices and that the normal mode of operation will resume when the system 500 has detected that the guest has re-entered their room. Selection of selectable control 964 causes the control device 504 to send a message via WAN 507 instructing the media playback system in the guest's room to resume the normal mode. Such an option might be useful if the other guests are remaining in the room while one guest is out.

The media playback systems 500*a*, 500*b*, and 500*c* in each room may include one or more respective sensors to detect the presence (or absence) of a guest in the respective room. In some implementations, the one or more sensors include a wireless network interface (e.g., the wireless network interfaces 232 of playback devices 502. Such wireless network interfaces may implement geo-fencing to determine whether the user's personal devices (e.g., control device 504) are present in the room. For instance, if the wireless network interface 232 of playback devices 502*c* or 502*d* can detect wireless transmissions from control device 504, the media playback system 500*b* may assume that Nick is present in the room.

In other examples, the media playback systems 500*a*, 500*b*, and 500*c* in each room based the mode of operation on room credentials used to enter each room. Referring back to FIG. 5, the doors to rooms 1, 2, and 3 are unlocked using keycard readers 552*a*, 552*b*, and 55*c*, respectively. The keycard reader for each room may include a network interface to communicate with the respective media playback system 500 in that room.

Different keycards may be coded with different access codes. If a keycard coded with a universal access code (as might be used by hotel staff) is used to unlock the door to room 2, the keycard read 552*b* may send a message to the media playback system 500*b* to enter restricted mode. Conversely, if a keycard coded with a person access code (as might be code for Nick's use) is used to unlock the door to room 2, the media playback system 500*b* may operate in normal mode.

In further examples, the media playback system 500 in each room may dynamically enter restricted mode if an unauthorized user or device attempts to control or otherwise access the system. For instance, if playback devices 502*c* or 502*d* receive control commands from a control device 504 other than Nick's personal device, the media playback system 500*b* may enter restricted mode with respect to those commands. As another example, if the NMD 503*b* detects a voice command from a voice other than Nick's voice, the media playback system 500*b* may enter restricted mode with respect to that voice command. That is, the media playback system 500*b* may respond to the control commands or voice commands only if they are permitted in the restricted mode.

At check-out, the home user settings and any other personal data of the user is removed from the media playback system within the guest's room. For instance, when Nick checks out of room 2, the HHID of the media playback system 100 may be disassociated from the media playback system 500*b* in room 2, which removes Nick's profile and all associated data from the media playback system. Alternatively, a guest may manually remove their personal data via the booking app, the controller app, or via a voice command to the media playback system 500*b* via the NMD 503*b*.

Check-out may be triggered in a variety of ways. For instance, a guest employee may check a guest out using terminal 551, which connects to booking system 550. Alternatively, a guest may initiate check-out via a booking app or a voice command to the NMD 503, which is forwarded to the booking system 550. As a further example, the booking system 550 may automatically check-out the guest after a given time, perhaps in combination with the sensor(s) in the guest's room detecting the absence of the guest in the room.

Within examples, some data from the guest's stay may be retained within the guest's user profile of their home media playback system 100 or within their user account(s) of their registered streaming audio services. For instance, in some cases, the guest may save the curated playlist within the user profile of their home media playback system 100 or within their user account of the streaming audio service, which may facilitate the guest enjoying the playlist on their home media playback system 100 after they return home. As another example, the guest's playback and other usage history during their stay may be retained in their user profile of their home media playback system 100 or within their user account(s) of their registered streaming audio services. Such data retention may facilitate the guest reviewing songs that they listened to and/or other cloud-service features they utilized during their stay.

IV. Example Techniques

Figure 10:
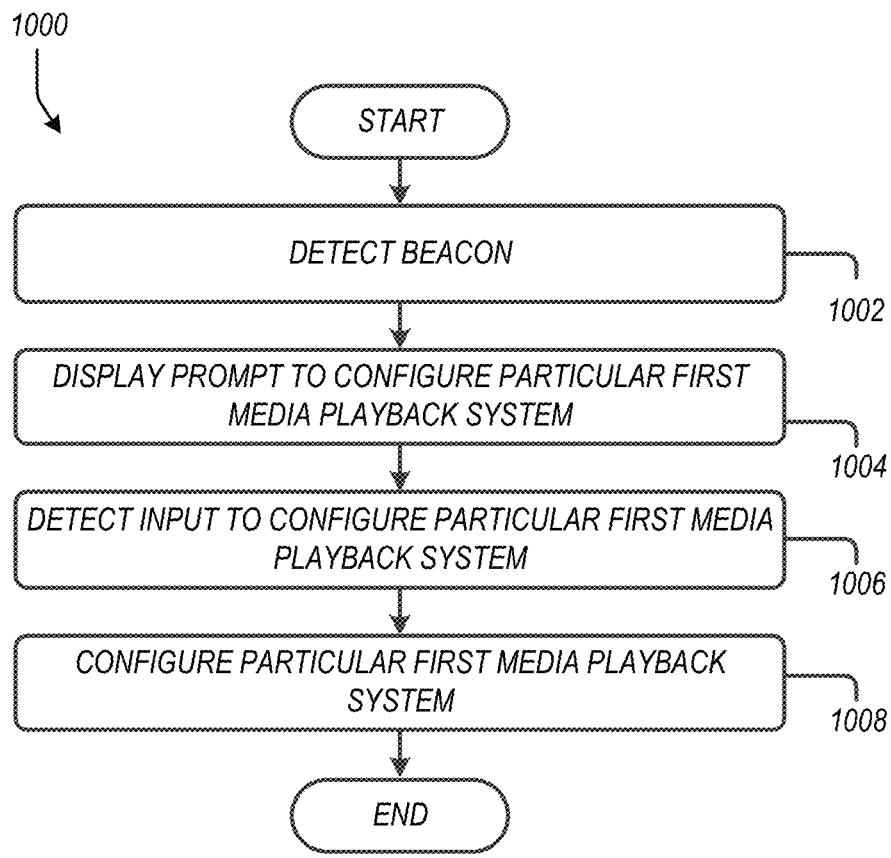
FIG. 10 shows an example media playback system configuration technique using beaconing, according to example implementations.
Figure 11:
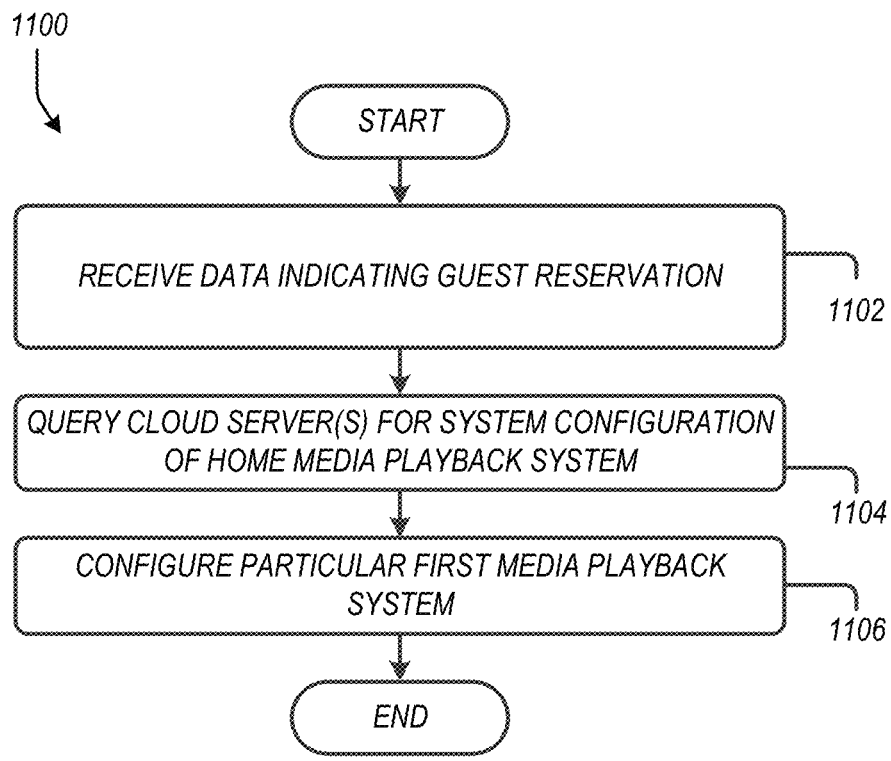
FIG. 11 shows an example media playback system configuration technique, according to example implementations.
Figure 12:
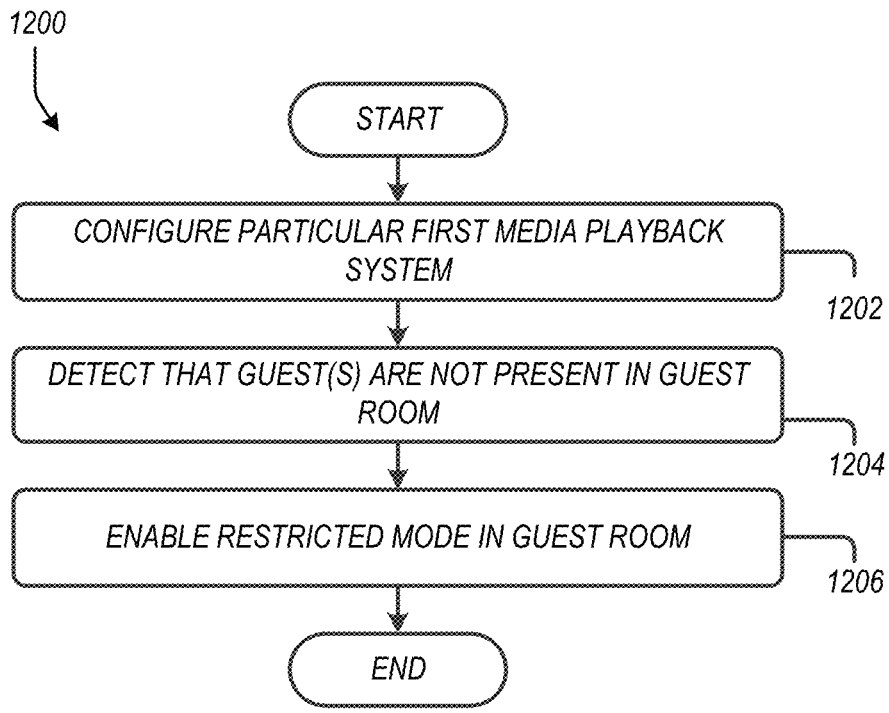
FIG. 12 shows an example technique to implement restricted mode on a media playback system within a place of accommodation, according to example implementations.

Implementations 1000, 1100, and 1200 shown in FIGS. 10, 11, and 12 present example embodiments of techniques described herein. These example embodiments that can be implemented within an operating environment including, for example, the media playback system 100 of FIG. 1, one or more of the playback device 102 of FIG. 2, one or more of the network devices 103 of FIG. 2, one or more of the control device 104 of FIG. 3, the system 500 of FIG. 5, as well as other devices described herein and/or other suitable devices. Further, operations illustrated by way of example as being performed by a media playback system can be performed by any suitable device, such as a playback device or a control device of a media playback system. Implementations 1000, 1100, and 1200 may include one or more operations, functions, or actions as illustrated by one or more of blocks shown in FIGS. 10, 11, and 12. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the implementations disclosed herein, the flowcharts show functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache, and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the implementations disclosed herein, each block may represent circuitry that is wired to perform the specific logical functions in the process.

a. Example Configuration of a Media Playback System Using a Beacon

As discussed above, embodiments described herein may involve using a beacon message to facilitate configuration of a media playback system within a guest's room with a system configuration of a guest's home media playback system. FIG. 10 illustrates an example implementation 1000 using such a beacon.

i. Detect Beacon

At block 1002, the implementation 1000 involves detecting a beacon. For instance, referring back to FIG. 5, the control device 504 may detect a beacon transmitted from a playback device (e.g., the playback devices 502c and/or 502d) of a particular first media playback system (e.g., the media playback system 500b). The control device 504 may detect the beacon via a wireless personal area network interface (e.g., a Bluetooth® interface).

The beacon includes data identifying a particular room of a place of accommodation (e.g., the hotel shown in FIG. 5) having multiple first media playback systems (e.g., media playback systems 500a-c) corresponding to respective individually bookable rooms (e.g., Rooms 1-3). The data may include a major value identifying the place of accommodation (hotel shown in FIG. 5) from among a plurality of place of accommodations each having multiple respective first media playback systems corresponding to respective individually bookable rooms. The data may also include a minor value identifying the particular room (e.g., room 2) of the place of accommodation from among the individually bookable rooms (rooms 1, 2, 3) of the place of accommodation.

Based on detecting the beacon, the control device 504 may transmit, via a wireless interface (e.g., a WiFi® interface) an acknowledgement of the beacon to the playback device of the particular first media playback system. Receiving the acknowledgement of the beacon may cause the playback device(s) (e.g., playback devices 502c and/or 502d) of the particular first media playback system (media playback system 500b) to play an audible welcome message. The audible welcome message may identify the place of accommodation and a particular bookable room in which the particular first media playback system is located.

ii. Display Prompt to Configure Particular First Media Playback System

At block 1004, the implementation 1000 involves displaying a prompt to configure the particular first media playback system. For instance, the control device 504 may cause a graphical display (e.g., graphical display 328 of FIG. 3B) to display a prompt (e.g., prompt 661 of FIG. 6) to configure the particular first media playback system (the media playback system 500b) with a system configuration of a second media playback system (the media playback system 100). Within examples, the control device 504 may display the prompt within user interface 326, within a lock screen, or via a push notification, among other examples. In example implementations, a control interface (e.g., a controller app as shown in FIGS. 4A and 4B) on the control device 504 is configured with a user profile (e.g., Nick's user profile) of the second media playback system (the media playback system 100) to control the audio playback by the second media playback system (the media playback system 100).

iii. Detect Input to Configure Particular First Media Playback System

At block 1006, the implementation 1000 involves detecting input to configure the particular first media playback system. For example, the control device 504 may detect, via the graphical display, touch input data indicating a selection of a particular selectable control (e.g., selectable control 664 of FIG. 6) within the displayed prompt that, when selected, causes the mobile device to configure the particular first media playback system (the media playback system 500b) with the system configuration of the second media playback system (the media playback system 100). Selection of the particular selectable control may indicate authorization to configure the particular first media playback system. In alternative implementations, authorization is obtained using other techniques, as described in connection with block 672 of FIG. 7.

iv. Configure Particular First Media Playback System

At block 1008, the implementation 1000 involves configuring the particular first media playback system. For instance, based on detecting the touch input data indicating the selection of the particular selectable control within the displayed prompt, the control device 504 may cause, via a wireless network interface, one or more servers of a computing system (e.g., the remote computing system(s) 505) to configure the particular first media playback system (the media playback system 500b) with one or more settings represented in a system configuration of the second media playback system (the media playback system 100).

Within examples, configuring the particular first media playback system may involve the messages and operations shown at 673, 674, 675, and/or 676 of FIG. 7, among other examples. For instance, the control device 104 may obtain, from the control interface, an identification of the second media playback system (e.g., a HHID of the media playback system 100), which uniquely identifies the second media playback system among all media playback systems from a given manufacturer. The control device 504 may send, via the network interface 330 to the one or more servers of the computing system (e.g., the remote computing system(s) 505), the identification of the second media playback system, as shown at 673 of FIG. 7. Such a message may cause the one or more servers to query one or more cloud servers for a system configuration of the second media playback system (the media playback system 100), as shown at 674 of FIG. 7.

In further examples, the control device 504 may obtain, from the control interface, an authorization token of the second media playback system (the media playback system 100). This authorization token permits access to only the second media playback system (the media playback system 100). The control device 504 may send the authorization token via the network interface 330 to the one or more servers of the computing system (e.g., the remote computing system(s) 505), which permits the one or more servers to query one or more cloud servers for the system configuration of the second media playback system.

b. Example Configuration of a Media Playback System

FIG. 11 illustrates an example implementation 1100 to configure a media playback system within a guest's room with a system configuration of a guest's home media playback system i. Receive Data Indicating A Guest Reservation At block 1102, the implementation 1100 involves receiving data indicating a guest reservation. For instance, referring back to FIG. 5, the system 500, perhaps via the booking system 550) may receive data indicating a guest reservation (e.g., for Nick's stay) to a place of accommodation (e.g., the hotel shown in FIG. 5) having multiple first media playback systems (e.g., the media playback systems 500*a-c*) corresponding to respective individually bookable rooms (e.g., rooms 1-3). The guest reservation may indicate a user profile of a second media playback system (e.g., Nick's user profile of the media playback system 100). The guest reservation may also indicate a booked room of the place of accommodation (e.g., room 2).

ii. Query Cloud Server(s) for System Configuration of Home Media Playback System At block 1104, the implementation 1100 involves querying one or more cloud servers for a system configuration of a guest's home media playback system. For instance, the system 500 may query, via a network interface of the computing system, one or more cloud servers (e.g., the remote computing system(s) 505) for a system configuration of the second media playback system (the media playback system 100). The system 500 may query the cloud servers as described in connection with block 674 of FIG. 7, among other examples.

iii. Configure Particular First Media Playback System

At block 1106, the implementation 1100 involves configuring the particular first media playback system. For instance, during a guest's stay associated with the guest reservation, the system 500 may configure a particular first media playback system (e.g., the media playback system 500*b*) within the booked room (room 2) with one or more settings represented in the system configuration of the second media playback system (the media playback system 100).

Configuring the particular first media playback system within the booked room with one or more settings represented in the system configuration of the second media playback system may involve any of the example configurations described herein. For instance, the system 500 may configuring a first zone of the particular first media playback system (e.g., the Bedroom zone of the media playback system 500*b*) with one or more settings of at least one zone of the second media playback system (e.g., Nick's Room of the media playback system 500).

Within examples, the system 500 may determine that the system configuration of the second media playback system (the media playback system 500) indicates that a first zone of the second media playback system (e.g., Nick's Room of the media playback system 500) has a zone name indicating a sleeping area. In such examples, the system 500 may configure the first zone of the particular first media playback system (e.g., the Bedroom zone) with one or more settings of the first zone of the second media playback system (e.g., Nick's Room).

Further, the system 500 may determine that the system configuration of the second media playback system indicates that the second media playback system includes multiple zones indicating respective sleeping areas (e.g., Master Bedroom and Bedroom). In such embodiments, the system 500 may configure the Bedroom zone of the media playback system 500*b* with one or more settings of the Master Bedroom zone based on the zone name indicating that the Master Bedroom zone corresponds to the Master Bedroom.

Within examples, the particular first media playback system within the booked room (the media playback system 500*b*) includes a second zone including a second playback device (e.g., the Bathroom zone). In such examples, the system 500 may determine, based on the system configuration, whether a second zone of the second media playback system (e.g., the Bathroom zone of the media playback system 100 has a zone name indicating a bathroom area. If so, the system 500 may configure the second zone of the particular first media playback system (i.e., the Bathroom zone) with one or more settings of the second zone of the second media playback system.

Within examples, the system 500 may configure one or more NMDs with a guest's user account(s) of one or more voice assistant services. Further, the system 500 may query one or more servers of a voice assistant service for one or more smart home settings of the user account of the voice assistant service and during the stay associated with the guest reservation, configure one or more smart home appliances (e.g., the smart illumination device(s) 508 or the smart thermostat 510) within the booked room with respective smart home settings received from the query.

In further examples, the system 500 may modify a given smart home setting of a smart home appliance configured with the user account of the voice assistant service to a corresponding smart home appliance within the booked room. For instance, a given smart home setting may be a pattern of illumination for one or more smart lights (e.g., the smart illumination device(s) 108). In such an example, modifying the smart home setting may involve configuring one or more smart lights of the booked room (e.g., the smart illumination device(s) 508*b*) with the pattern of illumination for one or more smart lights configured with the user account of the voice assistant service (e.g., the smart illumination devices 108).

c. Example Techniques to Implement Restricted Mode in a Media Playback System

As discussed above, embodiments described herein may involve a restricted mode that prevents unauthorized access to a guest's personal information and devices. FIG. 10 illustrates an example implementation 1200 to implement such a restricted mode.

i. Configure Particular First Media Playback System

At block 1202, the implementation 1200 involves configuring a particular first media playback system. For example, during a guest stay in the particular bookable room (e.g., Nicks' stay in room 2), the system 500 may configure a particular first media playback system within the particular bookable room (e.g., the media playback system 500*b* in room 2) with one or more settings represented in a system configuration of a second media playback system (e.g., the media playback system 100). The second media playback system may be registered to a user profile (e.g., Nick's user profile) associated with a guest reservation for the guest stay in the particular bookable room.

ii. Detect that Guest(s) are not Present in Guest Room

At block 1204, the implementation 1200 involves detecting that one or more guests are not present in the guest room. For instance, while the particular first media playback system (the media playback system 500*b* in room 2) is configured with the one or more settings represented in the system configuration of the second media playback system (the media playback system 100) during the guest stay in the particular bookable room, the system 500 may detect, via one or more sensors, that the one or more guests are not present in the particular bookable room. Example sensors include the keycard readers 552 (to detect guest presence using access codes coded into keycards), the network interfaces 230 of the playback devices within the room (to detect guest presence using geo-fencing), and/or a biometric sensor (to detect guest presence via voice or face recognition), as well as other suitable sensors.

iii. Enable Restricted Mode in Guest Room

At block 1206, the implementation 1200 involves enabling a restricted mode in the guest room while the guest(s) are not present in the guest room. For example, while the system 500 detects that a guest (e.g., Nick) is not present in their guest room (e.g., room 2), the system 500 may cause the particular first media playback system (e.g., the media playback system 500*b*) to disable one or more first features of the particular first media playback system. Other second features may remain enabled in the restricted mode. Within further examples, the system 500 may detect, via the one or more sensors, that the one or more guests are present in the particular bookable room, and enable a normal mode in which the one or more first features are enabled.

Example first features may impact a user's privacy and/or security. For instance, the first features may include controlling personal playlists, performing voice commands via a voice assistant service, and/or accessing a personal calendar, among other examples. Other example first features include features that were customized or otherwise modified when the media playback system and/or voice assistant in the guest room was configured with settings from the guest's home media playback system and/or voice assistant.

In contrast, example second features do not impact a user's privacy and/or security. For example, the second features may include stopping playback of audio content by the particular first media playback system and/or controlling smart lights, among other examples. Other example second features include features that are available whether or not the media playback system and/or voice assistant in the guest room is configured with settings from the guest's home media playback system and/or voice assistant.

V. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

(Feature 1) A method comprising receiving, via a network interface of a computing system, data indicating a guest reservation to a place of accommodation having multiple first media playback systems corresponding to respective individually bookable rooms, the guest reservation indicating (i) a user profile of a second media playback system and (ii) a booked room of the place of accommodation, querying, via the network interface of the computing system, one or more cloud servers for a system configuration of the second media playback system, the system configuration indicating configuration of one or more second playback devices of the second media playback system into respective zones of the second media playback system; and during a stay associated with the guest reservation, configuring, via the network interface of the computing system, a particular first media playback system within the booked room with one or more settings represented in the system configuration of the second media playback system, wherein configuring the particular first media playback system within the booked room with one or more settings represented in the system configuration of the second media playback system comprises configuring a first zone of the particular first media playback system with one or more settings of at least one zone of the second media playback system.

(Feature 2) The method of feature 1, wherein the first zone corresponds to a sleeping area of the booked room, and wherein configuring the particular first media playback system within the booked room with one or more settings represented in the system configuration of the second media playback system comprises: based on the system configuration, determining that a first zone of the second media playback system that has a zone name indicating a sleeping area; and configuring the first zone of the particular first media playback system with one or more settings of the first zone of the second media playback system.

(Feature 3) The method of feature 2, wherein the system configuration of the second media playback system indicates that the second media playback system includes multiple zones indicating respective sleeping areas, and wherein the method further comprises selecting the first zone among the multiple zones indicating respective sleeping areas based on determining that the first zone of the second media playback system that has a zone name indicating master bedroom.

(Feature 4) The method of feature 2, wherein the particular first media playback system within the booked room further comprises a second zone including a second playback device, the second zone corresponding to a bathroom area of the booked room, and wherein configuring the particular first media playback system within the booked room with one or more settings represented in the system configuration of the second media playback system comprises: based on the system configuration of the second media playback system, determining that a second zone of the second media playback system that has a zone name indicating a bathroom area; and configuring, via the network interface, the second zone of the particular first media playback system with one or more settings of the second zone of the second media playback system.

(Feature 5) The method of feature 2, wherein the one or more settings represented in the system configuration of the second media playback system comprise an alarm configured to play audio content in the first zone of the second media playback system at a particular time of day, and wherein configuring the first zone of the particular first media playback system with one or more settings of the first zone of the second media playback system comprises configuring, via the network interface, the first zone of the particular first media playback system to trigger an alarm configured to play the audio content in the first zone of the particular first media playback system at the particular time of day.

(Feature 6) The method of feature 1, wherein the method further comprises determining that the system configuration of the second media playback system indicates that the second media playback system includes multiple user profiles with respective settings, and wherein configuring the particular first media playback system within the booked room with one or more settings represented in the system configuration of the second media playback system comprises: determining that the guest reservation indicates a particular user account of the second media playback system; and configuring, via the network interface, the particular first media playback system with one or more settings that are particular to the particular user account of the second media playback system.

(Feature 7) The method of feature 1, wherein the method further comprises determining that the system configuration of the second media playback system indicates that the second media playback system is configured with a user account of a voice assistant service such that audio playback by the second media playback system is controllable via voice commands to the voice assistant service, and wherein configuring the particular first media playback system within the booked room with one or more settings represented in the system configuration of the second media playback system comprises during the stay associated with the guest reservation, configuring, via the network interface, one or more networked microphone devices of the particular first media playback system with the user account of the voice assistant service such that playback by the particular media playback system is controllable via voice commands to the voice assistant service.

(Feature 8) The method of feature 7, wherein the method further comprises: querying, via the network interface, one or more servers of the voice assistant service for one or more smart home settings of the user account of the voice assistant service; and during the stay associated with the guest reservation, configuring, via the network interface, one or more smart home appliances within the booked room with respective smart home settings received from the query.

(Feature 9) The method of feature 8, wherein the method further comprises modifying a given smart home setting of a smart home appliance configured with the user account of the voice assistant service to a corresponding smart home appliance within the booked room.

(Feature 10) The method of feature 9, wherein the given smart home setting of the smart home appliance configured with the user account of the voice assistant service comprises a pattern of illumination for one or more smart lights configured with the user account of the voice assistant service, and wherein modifying the given smart home setting of the smart home appliance configured with the user account of the voice assistant service to the corresponding smart home appliance within the booked room comprises: during the stay associated with the guest reservation, configuring, via the network interface, one or more smart lights of the booked room with the pattern of illumination for one or more smart lights configured with the user account of the voice assistant service.

(Feature 11) The method of feature 8, further comprising: during the stay associated with the guest reservation, configuring, via the network interface, a queue of the first zone with a curated playlist of audio tracks.

(Feature 12) The method of feature 1, wherein the method further comprises determining that the system configuration of the second media playback system indicates that the second media playback system is configured with respective user accounts of multiple streaming audio services, and wherein configuring the first zone of the particular first media playback system with one or more settings of the first zone of the second media playback system comprises configuring, via the network interface, the particular first media playback system with a user account of a particular one of the multiple streaming audio services.

(Feature 13) A tangible, non-transitory computer-readable medium having stored therein instructions executable by one or more processors to cause a device to perform the method of any of features 1-12.

(Feature 14) A device configured to perform the method of any of features 1-12.

(Feature 15) A system configured to perform the method of any of features 1-12.

(Feature 16) A method comprising: detecting, via a wireless personal area network interface, a beacon transmitted from a playback device of a particular first media playback system, the beacon including data identifying a particular room of a place of accommodation having multiple first media playback systems corresponding to respective individually bookable rooms; in response to detecting the beacon transmitted from the playback device of the particular first media playback system, causing a graphical display of the mobile device to display a prompt to configure the particular first media playback system with a system configuration of a second media playback system, wherein a control interface on the mobile device is configured with a user profile of the second media playback system to control the audio playback by the second media playback system; detecting, via the graphical display, touch input data indicating a selection of a particular selectable control within the displayed prompt that, when selected, causes the mobile device to configure the particular first media playback system with the system configuration of the second media playback system; and in response to detecting the touch input data indicating the selection of the particular selectable control within the displayed prompt, causing, via a wireless network interface, one or more servers of a computing system to configure the particular first media playback system with one or more settings represented in a system configuration of the second media playback system.

(Feature 17) The method of feature 16, wherein the data, within the beacon, identifying the particular room of the place of accommodation comprises (i) a major value identifying the place of accommodation from among a plurality of place of accommodations each having multiple respective first media playback systems corresponding to respective individually bookable rooms and (ii) a minor value identifying the particular room of the place of accommodation from among the individually bookable rooms of the place of accommodation.

(Feature 18) The method of feature 16, wherein the wireless personal area network interface is a 802.15-compatible wireless personal area network interface, and wherein the wireless network interface is a 802.11-compatible wireless personal area network interface.

(Feature 19) The method of feature 16, wherein causing the graphical display of the mobile device to display the prompt to configure the particular first media playback system with the system configuration of the second media playback system comprises causing the graphical display of the mobile device to display the prompt within a lock screen of the mobile device.

(Feature 20) The method of feature 16, wherein causing the graphical display of the mobile device to display the prompt to configure the particular first media playback system with the system configuration of the second media playback system comprises causing the graphical display of the mobile device to display the prompt within a push notification of the mobile device.

(Feature 21) The method of feature 16, wherein causing the one or more servers of the computing system to configure the particular first media playback system with one or more settings represented in the system configuration of the second media playback system further comprises: obtaining, from the control interface, an identification of the second media playback system, the identification uniquely identifying the second media playback system among all media playback systems from a given manufacturer; and sending, via the network interface to the one or more servers of the computing system, the identification of the second media playback system to cause the one or more servers to query one or more cloud servers for a system configuration of the second media playback system, the system configuration indicating configuration of one or more second playback devices of the second media playback system into respective zones of the second media playback system.

(Feature 22) The method of feature 21, wherein causing the one or more servers of the computing system to configure the particular first media playback system with one or more settings represented in the system configuration of the second media playback system further comprises: obtaining, from the control interface, an authorization token of the second media playback system, the authorization token permitting access to only the second media playback system; and sending, via the network interface to the one or more servers of the computing system, the authorization token permitting access to only the second media playback system to permit the one or more servers to query one or more cloud servers for the system configuration of the second media playback system.

(Feature 23) The method of feature 16, wherein causing the one or more servers of the computing system to configure the particular first media playback system with one or more settings represented in the system configuration of the second media playback system further comprises configuring a first zone of the particular first media playback system with one or more settings of at least one zone of the second media playback system.

(Feature 24) The method of feature 16, further comprising in response to detecting the beacon transmitted from the playback device of the particular first media playback system, transmitting, via the wireless interface, an acknowledgement of the beacon to the playback device of the particular first media playback system, wherein receiving the acknowledgement of the beacon causes the playback device of the particular first media playback system to play an audible welcome message identifying the place of accommodation and a particular bookable room in which the particular first media playback system is located.

(Feature 25) A tangible, non-transitory computer-readable medium having stored therein instructions executable by one or more processors to cause a device to perform the method of any of features 16-25.

(Feature 26) A device configured to perform the method of any of features 16-25.

(Feature 27) A system configured to perform the method of any of features 16-25.

(Feature 28) A method to be carried out by a system comprising multiple first media playback systems corresponding to respective individually bookable rooms of a place of accommodation; a sensor to detect presence of one or more guests in a particular bookable room; and a computing system comprising a network interface, one or more processors, and data storage having stored therein instructions executable by the one or more processors to cause the computing system to perform the method. The method comprising: during a guest stay in the particular bookable room, configuring, via a network interface of the computing system, a particular first media playback system within the particular bookable room with one or more settings represented in a system configuration of a second media playback system that is registered to a user profile associated with a guest reservation for the guest stay in the particular bookable room; while the particular first media playback system is configured with the one or more settings represented in the system configuration of the second media playback system during the guest stay in the particular bookable room, detecting, via the sensor, that the one or more guests are not present in the particular bookable room; and in response to detecting that the one or more guests are not present in the particular bookable room, causing, via the network interface, the particular first media playback system to disable one or more first features of the particular first media playback system, wherein one or more second features of the particular first media playback system are enabled while the sensor detects that the one or more guests are not present in the particular bookable room.

(Feature 29) The method of feature 28, wherein the one or more first features of the particular first media playback system consist of features that correspond to the one or more settings represented in the system configuration of a second media playback system that is registered to the user profile associated with the guest reservation for the guest stay in the particular bookable room.

(Feature 30) The method of feature 28, wherein the one or more first features comprise at least one of: (i) controlling personal playlists, (ii) performing voice-based purchases via a voice assistant service, and (iii) accessing a personal calendar, and wherein the one or more second features comprise at least one of: (i) stopping playback of audio content by the particular first media playback system and (ii) controlling smart lights in the particular bookable room.

(Feature 31) The method of feature 30, further comprising: while the particular first media playback system is configured with the one or more settings represented in the system configuration of the second media playback system during the guest stay in the particular bookable room, detecting, via the sensor, that the one or more guests are present in the particular bookable room; and in response to detecting that the one or more guests are not present in the particular bookable room, causing, via the network interface, the particular first media playback system to enable the one or more first features of the particular first media playback system, wherein one or more second features of the particular first media playback system remain enabled while the sensor detects that the one or more guests are not present in the particular bookable room.

(Feature 32) The method of feature 30, wherein the sensor comprises a network-connected keycard reader lock on the entry door to the particular bookable room, and wherein detecting, via the sensor, that the one or more guests are present in the particular bookable room comprises receiving, from the network-connected keycard reader lock, a message indicating that a keycard associated with the guest stay has unlocked the entry door.

(Feature 33) The method of feature 30, wherein the sensor comprises a biometric sensor configured to recognize at least one of (a) faces or (b) voices, and wherein detecting, via the sensor, that the one or more guests are present in the particular bookable room comprises detecting, via the biometric sensor, biometric data indicating that at least one guest is present in the particular bookable room.

(Feature 34) The method of feature 28, wherein the sensor comprises a wireless network interface, and wherein detecting, via the sensor, that the one or more guests are present in the particular bookable room comprises detecting, via the wireless network interface, geo-fencing data indicating that a smartphone associated with at least one guest is present in the particular bookable room.

(Feature 35) The method of feature 28, wherein configuring the particular first media playback system within the booked room with one or more settings represented in the system configuration of the second media playback system comprises: during the stay associated with the guest reservation, configuring, via the network interface, one or more networked microphone devices of the particular first media playback system with a user account of a voice assistant service such that playback by the particular media playback system is controllable via voice commands to the voice assistant service; and wherein the one or more first features comprise commands to the voice assistant service.

(Feature 36) A tangible, non-transitory computer-readable medium having stored therein instructions executable by one or more processors to cause a device to perform the method of any of features 28-35.

(Feature 37) A device configured to perform the method of any of features 28-35.

(Feature 38) A system configured to perform the method of any of features 28-35.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The invention claimed is:

1. A system comprising a computing device, wherein the computing device comprises a network interface, at least one processor and at least one non-transitory computer-readable medium including instructions that are executable by the at least one processor to:

receive, via the network interface, data indicating a guest reservation to a place of accommodation having multiple first media playback systems corresponding to respective individually bookable rooms, the guest reservation indicating (i) a user profile of a second media playback system and (ii) a booked room of the place of accommodation;

query, via the network interface, one or more cloud servers for a system configuration of the second media playback system, the system configuration indicating configuration of one or more second playback devices of the second media playback system into respective zones of the second media playback system; and during a stay associated with the guest reservation, configure, via the network interface, a particular first media playback system within the booked room with one or more settings represented in the system configuration of the second media playback system, wherein the instructions that are executable by the at least one processor to configure the particular first media playback system within the booked room with one or more settings represented in the system configuration of the second media playback system comprise instructions that are executable by the at least one processor to:

based on the system configuration, determine that a first zone of the second media playback system has a zone name indicating a sleeping area; and configure a first zone of the particular first media playback system with one or more settings of the first zone of the second media playback system, wherein the first zone of the particular first media playback system corresponds to a sleeping area of the booked room.

2. The system of claim 1, wherein the system configuration of the second media playback system indicates that the second media playback system includes multiple zones indicating respective sleeping areas, and wherein the instructions are further executable by the at least one processor to:

select the first zone of the second media playback system among the multiple zones indicating respective sleeping areas based on determining that the first zone of the second media playback system has the zone name of the first zone indicating a master bedroom.

3. The system of claim 1, wherein the particular first media playback system within the booked room further comprises a second zone including a second playback device, the second zone corresponding to a bathroom area of the booked room, and wherein the instructions that are executable by the at least one processor to configure the particular first media playback system within the booked room with one or more settings represented in the system configuration of the second media playback system comprise instructions that are executable by the at least one processor to:

based on the system configuration of the second media playback system, determine that a second zone of the second media playback system that has a zone name indicating a bathroom area; and configure, via the network interface, the second zone of the particular first media playback system with one or more settings of the second zone of the second media playback system.

4. The system of claim 1, wherein the one or more settings represented in the system configuration of the second media playback system comprise an alarm configured to play audio content in the first zone of the second media playback system at a particular time of day, and wherein the instructions that are executable by the at least one processor to configure the first zone of the particular first media playback system with one or more settings of the first zone of the second media playback system comprise instructions that are executable by the at least one processor to:

configure, via the network interface, the first zone of the particular first media playback system to trigger an alarm configured to play the audio content in the first zone of the particular first media playback system at the particular time of day.

5. The system of claim 1, wherein the instructions are further executable by the at least one processor to:

determine that the system configuration of the second media playback system indicates that the second media playback system includes multiple user profiles with respective settings, wherein the instructions that are executable by the at least one processor to configure the particular first media playback system within the booked room with one or more settings represented in the system configuration of the second media playback system comprise instructions that are executable by the at least one processor to:

determine that the guest reservation indicates a particular user account of the second media playback system; and configure, via the network interface, the particular first media playback system with one or more settings that are particular to the particular user account of the second media playback system.

6. The system of claim 1, wherein the instructions are further executable by the at least one processor to:

determine that the system configuration of the second media playback system indicates that the second media playback system is configured with a user account of a voice assistant service such that audio playback by the second media playback system is controllable via voice commands to the voice assistant service, and wherein the instructions that are executable by the at least one processor to configure the particular first media playback system within the booked room with one or more settings represented in the system configuration of the second media playback system comprise instructions that are executable by the at least one processor to:

during the stay associated with the guest reservation, configure, via the network interface, one or more networked microphone devices of the particular first media playback system with the user account of the voice assistant service such that playback by the particular first media playback system is controllable via voice commands to the voice assistant service.

7. The system of claim 6, wherein the instructions are further executable by the at least one processor to:

query, via the network interface, one or more servers of the voice assistant service for one or more smart home settings of the user account of the voice assistant service; and during the stay associated with the guest reservation, configure, via the network interface, one or more smart home appliances within the booked room with respective smart home settings received from the query.

8. The system of claim 7, wherein the instructions are further executable by the at least one processor to:

modify a given smart home setting of a smart home appliance configured with the user account of the voice assistant service to a corresponding smart home appliance within the booked room.

9. The system of claim 8, wherein the given smart home setting of the smart home appliance configured with the user account of the voice assistant service comprises a pattern of illumination for one or more smart lights configured with the user account of the voice assistant service, and wherein the instructions that are executable by the at least one processor to modify the given smart home setting of a smart home appliance comprise instructions that are executable by the at least one processor to:

during the stay associated with the guest reservation, configure, via the network interface, one or more smart lights of the booked room with the pattern of illumination for one or more smart lights configured with the user account of the voice assistant service.

10. The system of claim 1, wherein the instructions are further executable by the at least one processor to:

during the stay associated with the guest reservation, configure, via the network interface, a queue of the first zone with a curated playlist of audio tracks.

11. The system of claim 1, wherein the instructions are further executable by the at least one processor to:

determine that the system configuration of the second media playback system indicates that the second media playback system is configured with respective user accounts of multiple streaming audio services, and wherein the instructions that are executable by the at least one processor to configure the particular first media playback system within the booked room with one or more settings represented in the system configuration of the second media playback system comprise instructions that are executable by the at least one processor to:

configure, via the network interface, the particular first media playback system with a user account of a particular one of the multiple streaming audio services.

12. A tangible, non-transitory computer-readable medium including instructions that are executable by at least one processor of a computing system to:

receive, via a network interface, data indicating a guest reservation to a place of accommodation having multiple first media playback systems corresponding to respective individually bookable rooms, the guest reservation indicating (i) a user profile of a second media playback system and (ii) a booked room of the place of accommodation;

query, via the network interface, one or more cloud servers for a system configuration of the second media playback system, the system configuration indicating configuration of one or more second playback devices of the second media playback system into respective zones of the second media playback system; and during a stay associated with the guest reservation, configure, via the network interface, a particular first media playback system within the booked room with one or more settings represented in the system configuration of the second media playback system, wherein the instructions that are executable by the at least one processor to configure the particular first media playback system within the booked room with one or more settings represented in the system configuration of the second media playback system comprise instructions that are executable by the at least one processor to:

based on the system configuration, determine that a first zone of the second media playback system has a zone name indicating a sleeping area; and configure a first zone of the particular first media playback system with one or more settings of the first zone of the second media playback system, wherein the first zone of the particular first media playback system corresponds to a sleeping area of the booked room.

13. The tangible, non-transitory computer-readable medium of claim 12, wherein the system configuration of the second media playback system indicates that the second media playback system includes multiple zones indicating respective sleeping areas, and wherein the instructions are further executable by the at least one processor to:
select the first zone of the second media playback system among the multiple zones indicating respective sleeping areas based on determining that the first zone of the second media playback system has the zone name of the first zone indicating a master bedroom.

14. The tangible, non-transitory computer-readable medium of claim 12, wherein the particular first media playback system within the booked room further comprises a second zone including a second playback device, the second zone corresponding to a bathroom area of the booked room, and wherein the instructions that are executable by the at least one processor to configure the particular first media playback system within the booked room with one or more settings represented in the system configuration of the second media playback system comprise instructions that are executable by the at least one processor to:
based on the system configuration of the second media playback system, determine that a second zone of the second media playback system that has a zone name indicating a bathroom area; and
configure, via the network interface, the second zone of the particular first media playback system with one or more settings of the second zone of the second media playback system.

15. The tangible, non-transitory computer-readable medium of claim 12, wherein the one or more settings represented in the system configuration of the second media playback system comprise an alarm configured to play audio content in the first zone of the second media playback system at a particular time of day, and wherein the instructions that are executable by the at least one processor to configure the first zone of the particular first media playback system with one or more settings of the first zone of the second media playback system comprise instructions that are executable by the at least one processor to:
configure, via the network interface, the first zone of the particular first media playback system to trigger an alarm configured to play the audio content in the first zone of the particular first media playback system at the particular time of day.

16. The tangible, non-transitory computer-readable medium of claim 12, wherein the instructions are further executable by the at least one processor to:
determine that the system configuration of the second media playback system indicates that the second media playback system includes multiple user profiles with respective settings, wherein the instructions that are executable by the at least one processor to configure the particular first media playback system within the booked room with one or more settings represented in the system configuration of the second media playback system comprise instructions that are executable by the at least one processor to:
determine that the guest reservation indicates a particular user account of the second media playback system; and
configure, via the network interface, the particular first media playback system with one or more settings that are particular to the particular user account of the second media playback system.

17. The tangible, non-transitory computer-readable medium of claim 12, wherein the instructions are further executable by the at least one processor to:
determine that the system configuration of the second media playback system indicates that the second media playback system is configured with a user account of a voice assistant service such that audio playback by the second media playback system is controllable via voice commands to the voice assistant service, and wherein the instructions that are executable by the at least one processor to configure the particular first media playback system within the booked room with one or more settings represented in the system configuration of the second media playback system comprise instructions that are executable by the at least one processor to:
during the stay associated with the guest reservation, configure, via the network interface, one or more networked microphone devices of the particular first media playback system with the user account of the voice assistant service such that playback by the particular first media playback system is controllable via voice commands to the voice assistant service.

18. The tangible, non-transitory computer-readable medium of claim 17, wherein the instructions are further executable by the at least one processor to:
query, via the network interface, one or more servers of the voice assistant service for one or more smart home settings of the user account of the voice assistant service; and
during the stay associated with the guest reservation, configure, via the network interface, one or more smart home appliances within the booked room with respective smart home settings received from the query.

19. The tangible, non-transitory computer-readable medium of claim 18, wherein the instructions are further executable by the at least one processor to:
modify a given smart home setting of a smart home appliance configured with the user account of the voice assistant service to a corresponding smart home appliance within the booked room.

20. A method to be performed by a computing system, the method comprising:
receiving, via a network interface, data indicating a guest reservation to a place of accommodation having multiple first media playback systems corresponding to respective individually bookable rooms, the guest reservation indicating (i) a user profile of a second media playback system and (ii) a booked room of the place of accommodation;
querying, via the network interface, one or more cloud servers for a system configuration of the second media playback system, the system configuration indicating configuration of one or more second playback devices of the second media playback system into respective zones of the second media playback system; and
during a stay associated with the guest reservation, configuring, via the network interface, a particular first media playback system within the booked room with one or more settings represented in the system configuration of the second media playback system, wherein configuring the particular first media playback system within the booked room with one or more settings represented in the system configuration of the second media playback system comprises:
based on the system configuration, determining that a first zone of the second media playback system has a zone name indicating a sleeping area; and
configuring a first zone of the particular first media playback system with one or more settings of the first zone of the second media playback system, wherein the first zone of the particular first media playback system corresponds to a sleeping area of the booked room.

* * * * *